US008051450B2

(12) United States Patent
Robarts et al.

(10) Patent No.: US 8,051,450 B2
(45) Date of Patent: Nov. 1, 2011

(54) QUERY-BASED ELECTRONIC PROGRAM GUIDE

(75) Inventors: James O. Robarts, Redmond, WA (US); David S. Byrne, Seattle, WA (US); Steve Fluegel, Redmond, WA (US); Gabe Newell, Seattle, WA (US); Dan Newell, Seattle, WA (US); Kenneth Abbott, Marietta, GA (US)

(73) Assignee: Microsoft Corporation, Redmond, WA (US)

( * ) Notice: Subject to any disclaimer, the term of this patent is extended or adjusted under 35 U.S.C. 154(b) by 1495 days.

(21) Appl. No.: 10/686,984

(22) Filed: Oct. 16, 2003

(65) Prior Publication Data

US 2005/0278741 A1 Dec. 15, 2005

Related U.S. Application Data

(63) Continuation of application No. 08/828,709, filed on Mar. 31, 1997, now abandoned.

(51) Int. Cl.
*H04N 7/16* (2006.01)
*H04N 7/173* (2006.01)
*G06F 15/00* (2006.01)
*H04N 5/445* (2011.01)

(52) U.S. Cl. ............... 725/53; 725/47; 725/58; 386/296; 386/298

(58) Field of Classification Search .................. 707/1–5; 725/52, 53, 38, 47, 58; 715/369, 769; 348/734; 386/296, 298

See application file for complete search history.

(56) References Cited

U.S. PATENT DOCUMENTS

| 4,081,754 | A | 3/1978 | Jackson |
| 4,203,130 | A | 5/1980 | Doumit et al. |
| 4,228,543 | A | 10/1980 | Jackson |
| 4,694,490 | A | 9/1987 | Harvey et al. |
| 4,704,725 | A | 11/1987 | Harvey et al. |

(Continued)

FOREIGN PATENT DOCUMENTS

EP 0128481 A2 12/1984

(Continued)

OTHER PUBLICATIONS

Notice of Rejection from Application No. 2006-174233, Mailed on Sep. 25, 2008, 6 pages.

(Continued)

*Primary Examiner* — Pankaj Kumar
*Assistant Examiner* — Reuben Brown
(74) *Attorney, Agent, or Firm* — Lee & Hayes, PLLC

(57) ABSTRACT

An electronic program guide (EPG) organizes and presents programming information to the viewer and allows for creation of queries to facilitate both simple and complex searches of the programming information. The EPG is configured to automatically identify programs that a viewer is likely to prefer. The EPG collects viewing preferences of a viewer and, using these preferences; automatically develops queries for identifying programs that the viewer is likely to watch. The EPG also enables multiple viewers to merge their individual queries into one composite query or to run queries in background to periodically check for programs and notify the viewer when a program is identified. Queries are saved in an EPG database in a hierarchic structure with directories and sub-directories to make it easy for a viewer for organizing and retrieval. Also the EPG creates queries for a channel, network name or program using a 10-key keypad. The EPG is configured to interpret the data as representing all possible choices.

8 Claims, 12 Drawing Sheets

U.S. PATENT DOCUMENTS

| | | |
|---|---|---|
| 4,706,121 A | 11/1987 | Young |
| 4,751,578 A | 6/1988 | Reiter et al. |
| 4,908,713 A | 3/1990 | Levine |
| 4,977,455 A | 12/1990 | Young |
| 5,038,211 A | 8/1991 | Hallenbeck |
| 5,047,867 A | 9/1991 | Strubbe et al. |
| 5,068,734 A | 11/1991 | Beery |
| 5,151,789 A | 9/1992 | Young |
| 5,223,924 A | 6/1993 | Strubbe |
| 5,233,654 A | 8/1993 | Harvey et al. |
| 5,307,173 A | 4/1994 | Yuen et al. |
| 5,329,389 A * | 7/1994 | Nishida et al. ............... 349/106 |
| 5,335,079 A | 8/1994 | Yuen et al. |
| 5,335,277 A | 8/1994 | Harvey et al. |
| 5,353,121 A | 10/1994 | Young et al. |
| 5,382,983 A | 1/1995 | Kwoh et al. |
| 5,394,163 A | 2/1995 | Bullen et al. |
| 5,410,344 A | 4/1995 | Graves et al. |
| 5,469,206 A | 11/1995 | Strubbe et al. |
| 5,479,266 A | 12/1995 | Young et al. |
| 5,479,268 A | 12/1995 | Young et al. |
| 5,483,278 A | 1/1996 | Strubbe et al. |
| 5,524,193 A | 6/1996 | Covington et al. |
| 5,532,754 A | 7/1996 | Young et al. |
| 5,534,911 A | 7/1996 | Levitan |
| 5,541,662 A | 7/1996 | Adams et al. |
| 5,546,527 A * | 8/1996 | Fitzpatrick et al. ........... 715/769 |
| 5,552,833 A | 9/1996 | Henmi et al. |
| 5,559,549 A | 9/1996 | Hendricks et al. |
| 5,563,648 A | 10/1996 | Menand et al. |
| 5,570,126 A | 10/1996 | Blahut et al. |
| 5,572,643 A | 11/1996 | Judson |
| 5,583,560 A | 12/1996 | Florin et al. |
| 5,583,576 A | 12/1996 | Perlman et al. |
| 5,585,865 A | 12/1996 | Amano et al. |
| 5,585,866 A | 12/1996 | Miller et al. |
| 5,589,892 A | 12/1996 | Knee et al. |
| 5,594,228 A | 1/1997 | Swartz et al. |
| 5,594,509 A | 1/1997 | Florin et al. |
| 5,596,373 A | 1/1997 | White et al. |
| 5,604,542 A | 2/1997 | Dedrick |
| 5,606,691 A | 2/1997 | Watts et al. |
| 5,617,565 A | 4/1997 | Augenbraun et al. |
| 5,623,613 A | 4/1997 | Rowe et al. |
| 5,629,733 A * | 5/1997 | Youman et al. ................. 725/53 |
| 5,635,989 A | 6/1997 | Rothmuller |
| 5,657,091 A | 8/1997 | Bertram |
| 5,675,390 A | 10/1997 | Schindler et al. |
| 5,682,511 A | 10/1997 | Sposato et al. |
| 5,686,954 A * | 11/1997 | Yoshinobu et al. ............. 725/43 |
| 5,687,331 A | 11/1997 | Volk et al. |
| 5,689,799 A | 11/1997 | Dougherty et al. |
| 5,692,214 A | 11/1997 | Levine |
| 5,694,163 A | 12/1997 | Harrison |
| 5,694,546 A | 12/1997 | Reisman |
| 5,708,845 A | 1/1998 | Wistendahl et al. |
| 5,710,887 A | 1/1998 | Chelliah et al. |
| 5,724,424 A | 3/1998 | Gifford |
| 5,727,065 A | 3/1998 | Dillon |
| 5,731,844 A * | 3/1998 | Rauch et al. .................... 725/40 |
| 5,734,413 A | 3/1998 | Lappington et al. |
| 5,737,560 A | 4/1998 | Yohanan |
| 5,737,619 A | 4/1998 | Judson |
| 5,751,282 A | 5/1998 | Girard et al. |
| 5,752,159 A | 5/1998 | Faust et al. |
| 5,758,259 A | 5/1998 | Lawler |
| 5,761,606 A | 6/1998 | Wolzien |
| 5,774,664 A | 6/1998 | Hidary et al. |
| 5,774,666 A | 6/1998 | Portuesi |
| 5,778,181 A | 7/1998 | Hidary et al. |
| 5,781,189 A | 7/1998 | Holleran et al. |
| 5,781,228 A | 7/1998 | Sposato |
| 5,781,246 A | 7/1998 | Alten et al. |
| 5,801,747 A | 9/1998 | Bedard |
| 5,805,806 A | 9/1998 | McArthur |
| 5,818,441 A | 10/1998 | Throckmorton et al. |
| 5,818,935 A | 10/1998 | Maa |
| 5,828,419 A | 10/1998 | Bruette et al. |
| 5,838,906 A | 11/1998 | Doyle et al. |
| 5,845,303 A | 12/1998 | Templeman |
| 5,848,352 A | 12/1998 | Dougherty et al. |
| 5,860,073 A | 1/1999 | Ferrel et al. |
| 5,861,881 A | 1/1999 | Freeman et al. |
| 5,867,226 A | 2/1999 | Wehmeyer et al. |
| 5,873,080 A * | 2/1999 | Coden et al. ....................... 707/3 |
| 5,878,233 A | 3/1999 | Schloss |
| 5,883,677 A | 3/1999 | Hofmann |
| 5,884,056 A | 3/1999 | Steele |
| 5,892,508 A | 4/1999 | Howe et al. |
| 5,905,865 A | 5/1999 | Palmer et al. |
| 5,907,321 A | 5/1999 | Grossman et al. |
| 5,907,837 A | 5/1999 | Ferrel et al. |
| 5,918,012 A | 6/1999 | Astiz et al. |
| 5,953,046 A | 9/1999 | Pocock |
| 5,978,817 A | 11/1999 | Giannandrea et al. |
| 5,990,927 A | 11/1999 | Hendricks et al. |
| 6,005,565 A * | 12/1999 | Legall et al. ................... 715/721 |
| 6,006,257 A | 12/1999 | Slezak |
| 6,025,837 A | 2/2000 | Matthews, III et al. |
| 6,133,909 A | 10/2000 | Schein et al. |
| 6,177,931 B1 | 1/2001 | Alexander et al. |
| 6,215,531 B1 * | 4/2001 | Beery ............................. 348/734 |
| 6,216,264 B1 * | 4/2001 | Maze et al. ...................... 725/53 |
| 6,240,555 B1 | 5/2001 | Shoff et al. |
| 6,305,020 B1 | 10/2001 | Hoarty et al. |
| 6,359,636 B1 * | 3/2002 | Schindler et al. ............. 715/846 |
| 6,486,895 B1 | 11/2002 | Robertson et al. |
| 6,532,589 B1 * | 3/2003 | Proehl et al. ..................... 725/40 |
| 6,631,523 B1 | 10/2003 | Matthews, III et al. |
| 6,668,377 B1 | 12/2003 | Dunn |
| 6,963,906 B2 | 11/2005 | Portuesi |
| 7,032,185 B1 * | 4/2006 | Yohanan ........................ 715/847 |
| 2003/0001895 A1 * | 1/2003 | Celik ............................. 345/769 |
| 2003/0084444 A1 | 5/2003 | Ullman et al. |
| 2003/0101232 A1 | 5/2003 | Ullman et al. |
| 2007/0220107 A1 | 9/2007 | Reisman |
| 2008/0235725 A1 | 9/2008 | Hendricks |

FOREIGN PATENT DOCUMENTS

| | | |
|---|---|---|
| EP | 0572090 A2 | 12/1993 |
| EP | 0 705 036 A2 | 4/1996 |
| EP | 0 721 253 A2 | 7/1996 |
| EP | 0 723 369 A1 | 7/1996 |
| EP | 0 735 749 A2 | 10/1996 |
| EP | 0 757 485 A2 | 2/1997 |
| EP | 0 758 833 A2 | 2/1997 |
| EP | 0 774 866 A2 | 5/1997 |
| EP | 0 774 868 A1 | 5/1997 |
| EP | 0 735 749 A3 | 9/1997 |
| EP | 0 758 833 A3 | 10/1997 |
| EP | 0 854 645 A2 | 7/1998 |
| JP | 63211010 | 9/1988 |
| JP | 1093879 | 4/1989 |
| JP | 2093767 A | 4/1990 |
| JP | 5089173 A | 4/1993 |
| JP | 06 124309 | 5/1994 |
| JP | 6507037 | 8/1994 |
| JP | 6276501 A | 9/1994 |
| JP | 07-73243 | 3/1995 |
| JP | 7160732 | 6/1995 |
| JP | 7234881 | 9/1995 |
| JP | 7284035 | 10/1995 |
| JP | 7297796 A | 11/1995 |
| JP | 7303216 | 11/1995 |
| JP | 7303216 A | 11/1995 |
| JP | 8019063 A | 1/1996 |
| JP | 08-051595 | 2/1996 |
| JP | 8051585 | 2/1996 |
| JP | 8180504 | 7/1996 |
| JP | 8249324 | 9/1996 |
| JP | 8275077 A | 10/1996 |
| JP | 8314920 | 11/1996 |
| JP | 9083888 A | 3/1997 |
| JP | 9083891 | 3/1997 |
| JP | 9200638 | 7/1997 |
| JP | 10207914 | 8/1998 |
| WO | WO 94/14284 | 6/1994 |

| WO | WO 96/17473 | 6/1996 |
| WO | WO 96/41470 | 12/1996 |
| WO | WO 97/02702 | 1/1997 |
| WO | WO 97/30546 | 8/1997 |
| WO | WO 97/46011 | 12/1997 |
| WO | WO 97/48230 | 12/1997 |
| WO | WO9821877 | 5/1998 |
| WO | WO 98/43183 | 10/1998 |

OTHER PUBLICATIONS

Notice of Rejection from Application No. 2005-370875, Mailed on Sep. 10, 2008, 10 pages.

Kita, Mitsunari, "From the Scene of Using the Internet for Business/ The Internet TV Guide," Internet Magazine, No. 23, pp. 288-291, Impress, Inc., Japan, Dec. 1, 1996.

Official Notice of Rejection for Japanese Patent Application No. 2006-174235, mailed on Nov. 18, 2008, 8 pages.

"HP Division Talks to Shops About Video Box", Voight et al., AdWeek Midwest, v XXXVI, n. 48, p. 34, Nov. 27, 1995.

"Writhing in the city of New Orleans", Burgi et al., MEDIAWEEK, v4,n22, p. 20(4), May 30, 1994.

Loeb, Shoshana, "Architecting Personalized Delivery of Multimedia Information," Journal of the ACM, Association for Computing Machinery, New York, NY, US, vol. 35, No. 12, Dec. 1992, pp. 39-48.

Ehrmantraut, Michael, "The Personal Electronic Program Guide— Towards the Pre-Selection of Individual TV Programs," Proceedings of the International Conference on Information and Knowledge Management CIKM, ACM, New York, NY, US, Nov. 12, 1996, pp. 243-250.

JP second Official Notice of Rejection dated Jul. 28, 2006, from counterpart JP patent application, Japanese Patent Application No. 125,155/1998, 4 pages.

PR Newswire, "Iguide Debuts TV Guide Online Centerpiece", Mar. 1996, 1 page.

Eric Schmuckler et al., "A marriage that's made in cyberspace. (television networks pursue links with online information services)", May 16, 1994, MEDIAWEEK, 4 pages.

"Prodigy launches interactive TV listing", Apr. 22, 1994, Public Broadcasting Report, abstract.

"Prodigy offers total television online guide", Apr. 12, 1994, Media Daily, abstract.

"Prodigy launched interactive TV listing service on computer network", Apr. 12, 1994, Communications Daily, abstract.

Untitled Article, Apr. 18, 1994, Television Digest, abstract.

"Intercast Industry Group Web Page", retrieved from World Wide Web at web site URL www.intercast.org.

Mark Berniker, "TV Guide' going online", Broadcasting & Cable, Jun. 1994, 2 pages.

Robert Cowart, "Mastering Windows 3.1 Special Edition", 1993, pp. 84-87.

Connolly, Hypertext Markup Language—2.0, RFC 1866, Nov. 1995, MIT/W3C.

\* cited by examiner

| STORAGE POINTER | TITLE | ACTOR | CC | STEREO | TIME | NETWORK | SUPPLEMENTAL CONTENT | DESCRIPTION |
|---|---|---|---|---|---|---|---|---|
| PROG1 | MURDER, SHE WROTE | LANDSBURY | YES | YES | 8:00 PM THURSDAY | CBS | CONTENT1 | "The Secret of Gila Junction" Jessica... |
| PROG2 | SEINFELD | SEINFELD | YES | YES | 9:00 PM THURSDAY | NBC | http://www.nbc.com/ seinfeld.html | "The Friars Club" Jerry tries... |
| PROG3 | STAR TREK NEXT GEN. | STEWART | YES | YES | 10:00 PM FRIDAY | FOX | http://www.fox.com/ startrek.html http://www.collections.com/ trekiecollectables.html | "Delta Vega" Picard is faced.... |

Fig. 4

QUERY-BASED ELECTRONIC PROGRAM GUIDE

RELATED APPLICATIONS

The present application is a continuation of U.S. patent application Ser. No. 08/828,709, filed on Mar. 31, 1997 now abandoned and entitled "Query-Based Electronic Program Guide".

TECHNICAL FIELD

This invention relates to entertainment systems, such as interactive television or interactive computing network systems, and to electronic program guides which operate in conjunction with these systems. More particularly, this invention relates to methods for operating electronic program guides using auto-generated and viewer-generated queries to identify programs or other programming information.

BACKGROUND OF THE INVENTION

Television viewers are very familiar with printed programming schedules that appear in daily newspapers or weekly magazines, such as TV Guide®. The printed program guide lists the various television shows in relation to their scheduled viewing time on a day-to-day basis.

Cable TV systems often include a channel with a video broadcast of the printed program guide. The cable channel is dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer watches a continuously refreshing set of programs within three or four time slots.

Data for available programs is typically received by a cable system as a plurality of data records. Each available program has a single corresponding data record indicating a variety of information about the program such as its channel, its starting and ending times, its title, names of starring actors, whether closed-captioning and stereo are available, and perhaps a brief description of the program. It is not difficult to format a grid such as described above from this type of data records. The grid is typically formatted once at the cable system's headend and broadcast repeatedly and continuously to the thousands of homes served by the cable system.

Newer, interactive cable distribution systems feature electronic program guides (EPGs) which function somewhat similar to the broadcast program listing channels described above. Rather than scrolling automatically, however, an EPG allows a viewer to use a remote control device or other input device to scroll as desired both horizontally and vertically through a program grid. This functionality utilizes the two-way communications capabilities of interactive cable systems.

The EPG is typically implemented in software which runs on a set-top box (STB) connected between a TV and a cable system home entry line. When scrolling to a new column or row, the set-top box inserts the appropriate programming information into each new row or column. This information is either cached at the STB, or requested from the cable system's headend.

Interactive systems permit viewers to control what programs are shown on their TV and when. Movies-on-demand is one example of this interactive control. A viewer can peruse a list of available movies from the EPG, and then order a selected movie. The STB sends a request for the movie to the headend server. The movie is retrieved and transmitted to the requesting STB. Movies-on-demand thus enables viewers to shop, purchase, and watch a movie at their convenience, as opposed to being restricted to certain start times as is typical with conventional premium or pay-per-view channels.

Many industry and commercial experts expect entertainment systems to evolve to the point of offering many other interactive services to the consumers. For instance, consumers will be able to use their TV or computer to shop for groceries or other goods, conduct banking and other financial transactions, play games, or attend educational courses and take exams.

Conventional distribution networks support many channels. It is common for a TV audience to have 50 to 100 channels. However, as technology improves and programming content continues to expand, the number of channels are expected to increase dramatically to many hundreds, or even thousands of channels.

One problem with the growth in the number of channels is that vastly enlarged selection, while appealing to a viewer, will make it more difficult for a viewer to locate programs of their preference. Traditional methods of locating programs— such as memorizing channel numbers, scanning program grids, or random surfing—will become less effective as the number of channels increase. For example, imagine the difficulty in trying to present hundreds or thousands of programs in a scrollable grid-like EPG user interface (UI), which might show only a few programs or channels at one time. This UI structure will most likely be unworkable for large program and channel offerings. Additionally, surfing through hundreds or thousands of channels will likely consume a large amount of time, causing the viewer to miss the programs he/she is attempting to find.

It is also likely that the traditional practice of relating programs and networks to specific channels will become less meaningful as the number of channels increases. Suppose, for example, a viewer might be interested in watching football. Today, a viewer might remember that channel 6 (NBC) and channel 3 (FOX) carry the football games and simply tune to one of these channels. In the future, however, there might be football games being broadcast on channels 78, 495, and 1042. These channels might be small local stations that are broadcasting their local football team, or one of many channels used by a major network. Viewers are not likely to remember that channels 78, 495, and 1042 are carrying football games at specific times.

Moreover, the correlation of channels to networks and programs vary from market to market. For instance, the sports network ESPN might be carried on channel 15 in one market and on channel 29 in another market. Memorizing program offerings in terms of channel numbers will prove frustrating as a viewer travels from one market to the next.

Accordingly, there is a need to develop operating methods which allow viewers to easily find programs or networks regardless of the channels on which they are carried. Additionally, these operating methods should enable viewers to locate programs regardless of whether they remember the channel number, program name, or network name.

Toward this end, a company named TVHost, Inc. has developed a software-based product "ETV" which assists a viewer in locating particular programs. The ETV system organizes the different program offerings according to different topical categorizes. FIG. 1 shows an example screen display of a graphical user interface (UI) window 20 supported by the ETV system. The ETV window 20 has a first pane 22 that lists alphabetically predefined types of programs, such as Business, Children, Educational, Game Shows, and so forth. The viewer can control a focus frame or highlight bar 24 to choose a type of program from the first pane 22. A second pane 26 contains a list of programs that are available for the program type highlighted in the first pane 22. In this example, the type "business" is highlighted, and hence business-related programs are shown in the second pane 26. The second pane 26 also provides other programming information including start time, network or station, and duration.

The ETV system thereby offers an alternative to a scrollable grid presentation which organizes programs according to type. This allows the viewer to select a program type, and then review the programs offered for this type. The ETV system also permits rudimentary "search" capabilities. FIG. 2 shows another graphical UI window 30 which appears when performing a search. A first pane 32 contains a scrollable alphabetized list of stations, and allows a viewer to choose a station. A second pane 34 contains a scrollable alphabetized list of program types from which the viewer may select a program type. Other parameters, such as MPAA, rating, and start time, can also be selected by the viewer. Based upon these selections, the ETV system locates programs which are of a particular type, from the selected station, and satisfy the ratings and start times.

The ETV system is limited in many respects. The ETV system does not permit searches on arbitrary fields. Instead, the categories are predefined for the viewer. The viewer is not able to define his/her own complex searches using, for example, Boolean logic of "OR," "AND," and "NOT." Another limitation is that the ETV system does not provide any active controls which intelligently narrows selections based upon viewer selections. An "active" control is a control that does not require any other action on the part of the user. For instance, if a viewer selects a station in pane 32 of the search window 30 (FIG. 2), all program types will be listed in the second pane 34. In fact, the same lists will always occur in both the first and second panes 32, 34 regardless of what selections the viewer has previously made. The viewer is not able to see any results until the viewer activates a "Begin" search key 36.

Accordingly, there remains a need to develop operating methods which decouple associations between the channel and network or program and also allow intelligent search procedures to better assist the viewer in locating preferred programs.

SUMMARY OF THE INVENTION

This invention concerns an electronic program guide (EPG) which enables creation of queries to facilitate simple and complex searches across predefined and arbitrary fields. The EPG organizes and presents programming information to a viewer. The EPG is implemented in software which executes on a processor resident in a viewer computing unit. As described herein, the viewer computing unit can be implemented as a set-top box (STB) connected to a television (TV), as a computer and monitor, or the like.

According to one aspect of this invention, the EPG is configured to automatically identify programs that a viewer is likely to prefer. The EPG collects viewing preferences of a viewer by, for example, monitoring and logging viewing habits of the viewer or through creation of a viewer profile in which a viewer answers a series of questions designed to discover the viewer's likes and dislikes. Based upon the these viewer preferences, the EPG automatically develops queries for identifying programs that the viewer is likely to watch and presents those programs to the viewer.

The EPG can further be configured to merge the queries of individual viewers into a composite query which searches for programs on behalf of all viewers. Each viewer defines his/her own query. For instance, one family member might define a query for college basketball games, another family member might define a query for Civil War programs, and another family member might define a query for cartoons. The EPG then creates a unified query which combines the three queries to jointly identify programs which satisfy any one of the three quenes.

The EPG saves queries in a hierarchic structure to make it easy for a viewer to organize and retrieve queries. The viewer can define directories and sub-directories to organize the queries. For instance, a viewer might arrange queries for different kinds of movies within a Movie directory and queries for sports within a Sports directory. Another example organization is to arrange queries within separate user directories.

According to another aspect, the EPG is configured to run queries in background so that the queries are periodically executed unbeknownst to the viewer. When the EPG identifies a particular program satisfying the background query, the EPG automatically notifies the viewer of the program and/or automatically initiates procedures to record the program. For example, suppose a viewer wants to watch shows on the Great Wall of China. The viewer can define a query for identify any programs mentioning the Great Wall and have the query execute in background, perhaps for a long duration of time. As the EPG identifies programs on the Great Wall, the EPG notifies the viewer of when the program is scheduled to be shown, and to initiate recording procedures.

According to another aspect of this invention, the EPG assists a viewer in finding a program, channel number, or network by using a 10-key keypad as typically found on remote control handsets. The keypad has ten numerical keys, which also correspond to associated letters. When the viewer presses a key, the viewer might intend to be entering a number to find a channel, or one of the letters associated with the key for spelling the program or network name. Regardless of the viewer's intent, the data generated when the key is depressed is the same. The EPG is configured to interpret the data as representing all possible choices, including the number and letters associated with the key. For instance, when a viewer depresses the number "5" key, the EPG interprets that data to mean "5" or "J" or "K" or "L." The EPG then identifies programs, channels, and networks which begin with or contains the number or letters. As the viewer continues to enter each digit, the list of programs, channel, and networks dynamically narrows. After a few button presses, the viewer is presented with a short list of possible choices.

BRIEF DESCRIPTION OF THE DRAWINGS

FIG. 4 is a simplified example of data fields in a data structure maintained by an electronic program guide (EPG).

DETAILED DESCRIPTION OF THE PREFERRED EMBODIMENT

Figure 3:
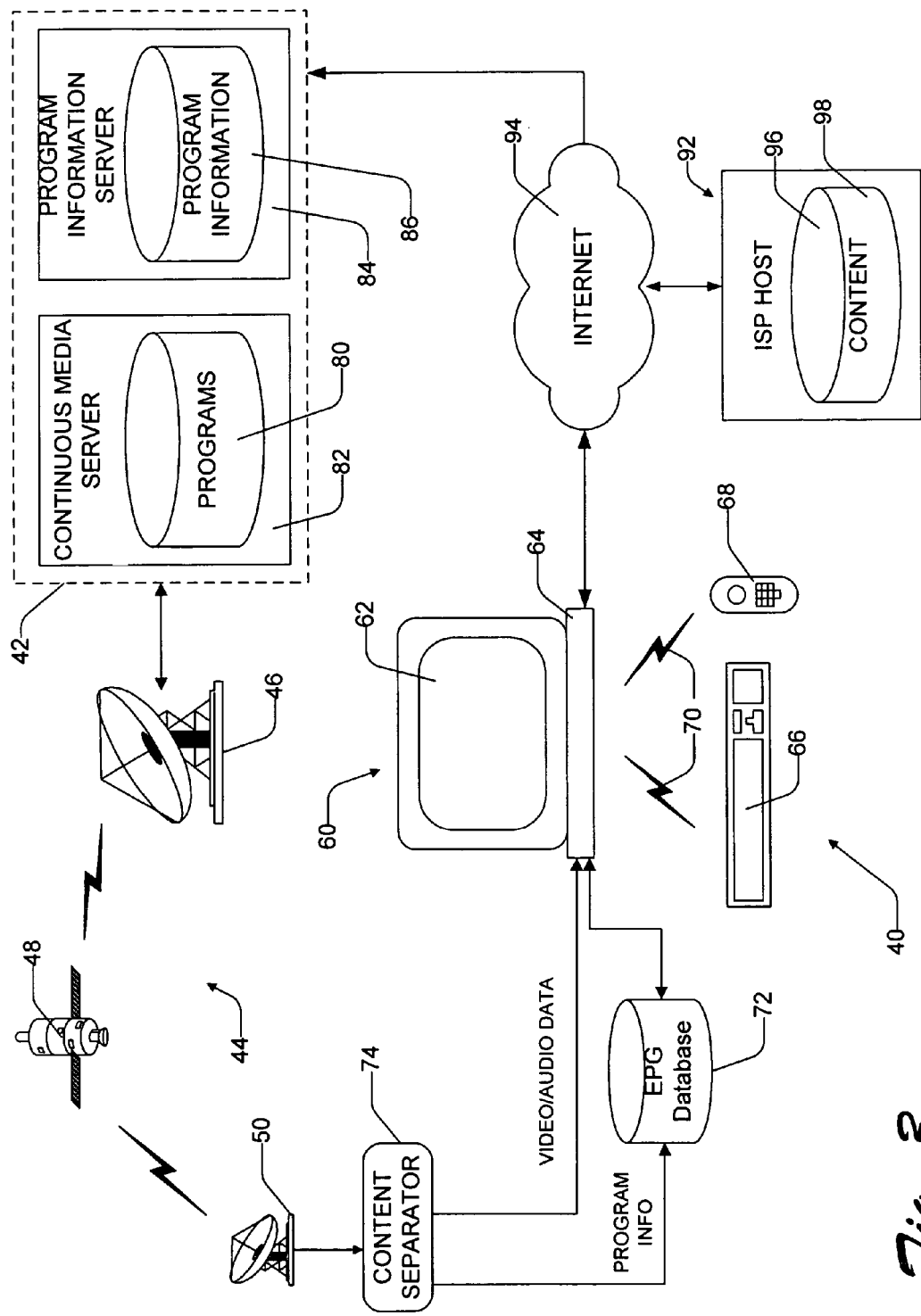
FIG. 3 is a diagrammatic illustration of an entertainment system.

FIG. 3 shows an entertainment system 40 according to one implementation of this invention. System 40 includes a centralized headend or content provider 42 which is configured to provide continuous video content programs to multiple subscribers. Programs provided by content provider 42 might include traditional broadcast TV shows, on-demand movies, games, and other services such as those commonly provided in the past by on-line computer services.

The content provider 42 supplies video and other data over a distribution network 44 to the subscribers. In this implementation, the network 44 is a satellite network which transmits the data in a digital format from the content provider directly to individual subscribers. The satellite network 44 includes a transmitter 46, an orbiting satellite 48, and a receiver 50. As one example, the satellite network 44 can be implemented using DSS (Direct Satellite System) technology, where individual subscribers own small 18" receiving dishes 50 which are resident at their homes. Video, audio, and other data are transmitted in digital format from the satellite transmitter 46 to the orbiting satellite 48, where the data are redirected to the satellite receiver 50.

The distribution network 44 can be implemented in other ways instead of DSS technology. One implementation is a multi-tier network which includes a high-speed, high-bandwidth fiber optic cable network between the content provider 40 and regional distribution nodes (not shown), and conventional home entry lines, such as twisted-pair lines or coaxial cable, between the distribution nodes and viewer computing units 60. Anther network implementation might include traditional RF broadcast technologies. The network can also be constructed using a combination of wireless and wire-based technologies.

Another approach beside to broadcasting the content to the subscribers is by multicasting the content over the Internet. With this approach, the content providers transmit the data content to a designated multicast address on the Internet. Subscribers listen to the multicast address to receive the primary content.

Each subscriber residence has at least one viewer computing unit 60. In the illustrated implementation, the viewer computing unit 60 is embodied as a is broadcast enabled personal computer, or simply "broadcast PC." The broadcast PC 60 has a large computer monitor 62, a processing unit 64, and input devices in the form of remote keyboard 66 and/or remote control handset 68. The remote keyboard 66 and handset 68 are remotely coupled to the processing unit 64 via a wireless data link 70, such as infrared (IR) or radio (RF), although the remotes can be directly connected. The broadcast PC 60 also includes an EPG database 72 and a content separator 74, which are shown separately for illustration purposes, but can be incorporated into the processing unit 64.

It is noted that the viewer computing unit 60 can be implemented in other forms. For instance, the viewer computing unit 60 can be embodied as a set-top box coupled to a conventional television. Another implementation includes a TV or other visual display device, which has processing components incorporated therein.

Content provider 42 is configured to originate the broadcast programs or to rebroadcast programs received from another source, such as a satellite feed or another cable system. In addition, the content provider 42 is configured to maintain a database of programs 80, such as feature-length movies, past TV shows, games, and other entertainment videos, which can be played individually to requesting subscribers in an on-demand mode. These programs can be requested via a back channel, such as a telephone link or Internet link (described below). In the case of a cable based network, the cable might function as both distribution channel and back channel to support interactivity. As technology continues to improve, the receiver 50 might be replaced with a transceiver which is capable of both receiving digital data from the satellite system, and transmitting data back across the satellite system.

The content provider 42 includes a continuous media server 82 which distributes the digital video data streams kept in the programs database 80. The continuous media server and video program database are implemented, for example, as a disk array data storage system consisting of many large capacity storage disks. The video data streams of the movies are stored digitally on the storage disks in predetermined or mapped locations. The locations of the video data streams are kept in a memory map and each video data stream is accessed through pointers to the particular memory location. The continuous media server can service simultaneous requests for a program (even the same program) from many viewers.

The content provider 42 also has an program information server 84 to serve programming information to the viewer computing unit 60. The program information server 84 is implemented as a structured query language (SQL) database 86 with records containing information relating to available shows or programs.

FIG. 4 shows an example data structure 88 for organizing programming information within the EPG database 86. The data structure includes various data fields 90 for holding programming information. The data fields contain program titles, actor names, whether the program has closed captioning or stereo audio, the scheduled time of the program, the network name, description text, and the like. The data structure 88 holds pointer to locations within the storage subsystem of the continuous media server 82 which identify storage locations of the programs corresponding to the program records.

The data structure 88 might also contain target specifications (memory pointer, hyperlink, etc.) to one or more target resources which maintain supplemental content for the programs. The supplemental content can be stored at, and served from, the content provider 42 or from an independent service provider. The supplemental content can be text, hypermedia, graphics, video, picture, sound, executable code, or other multimedia types which enhance the broadcast program. Examples of possible supplemental content include interactive questions or games related to the program, additional trivia on the movies or TV shows, advertisements, available merchandise or other memorabilia, Web pages to programs of similar type or starring the same actors/actresses, and so on.

With reference again to FIG. 3, the content provider 42 broadcasts multiple programs for different networks and channels as one continuous digital data feed, as is conventional in DSS. The EPG programming information is transmitted along with the video and audio data. The data is compressed and placed in digital transport packets for transmission over the satellite system. If desired, the data pertaining to particular channels or programs can be scrambled. The receiver 50 de-scrambles and decompresses the data stream, and then reconstructs the video, audio, and programming data from the digital transport packets. The content separator 74 separates the video and audio data from the programming information. The video/audio data is directed to a tuner in the viewer computing unit 60 which selects a particular channel and displays the video on the monitor 62 and plays the corresponding audio. The viewer controls program selection using the keyboard 66 or remote control handset 68. The programming information is input to the EPG database 72. By caching the programming information in the local EPG database 72, interactive functionality used to locate and select certain programs from the EPG is handled locally.

The entertainment system 60 also includes an independent service provider (ISP) 92 which distributes digital content to the viewer computing unit 60 over a second network 94. An example of the second network 94 is a public network, such as the Internet. The ISP 92 has an ISP host 96 and a content database 98 to serve various multimedia content to the user. For instance, the ISP host 96 might store one or more target resources (such as a Web page) that can be rendered by the viewer computing unit 62.

According to the FIG. 3 arrangement, the viewer computing unit 60 receives traditional broadcast, on-demand programs, and programming information from the content provider 42. The viewer computing unit 60 also receives supplemental interactive content from the content provider 42 or from the independent service provider 92. The back channel for facilitating interactive control is provided through network 94. The off-site supplemental information provided by the ISP 92 is correlated with the programs within the program records data structure 88 in program information server 84. As shown in FIG. 4, programs with supplemental content provided by other servers has a target specification listed in one of the data fields.

Figure 5:
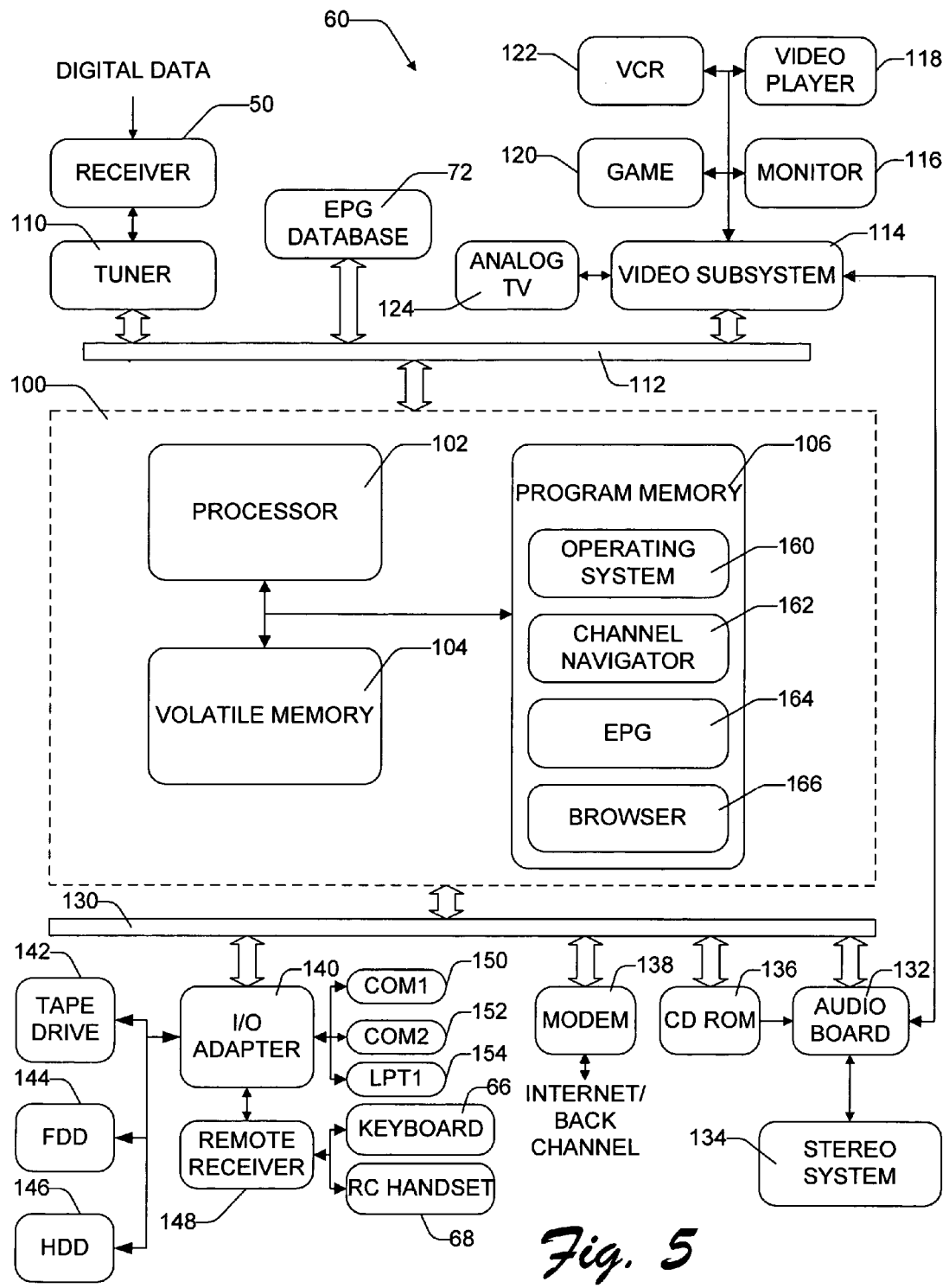
FIG. 5 is a block diagram of a viewer computing unit.

FIG. 5 shows an example implementation of the viewer computing unit 60 in more detail. It includes a mother board 100 having a processor 102 (e.g., x86 or Pentium® microprocessor from Intel Corporation), a volatile memory 104, and a program memory 106. The viewer computing unit 60 includes a digital broadcast receiver 50, such as a satellite dish receiver (FIG. 3). The digital receiver 50 receives digital data broadcast over the satellite distribution network 44. The receiver 50 is coupled to a tuner 110 which tunes to frequencies of the satellite transponders in the satellite distribution network. The tuner 110 has one or two primary components: a specialized digital broadcast tuner and/or a generalized digital broadcast tuner. The specialized digital broadcast tuner is configured to receive digital broadcast data in a particularized format, such as MPEG-encoded digital video and audio data. The generalized digital broadcast tuner is configured to receive digital data in many different forms, including software programs and programming information in the form of data files.

The tuner 110 is connected to the mother board 100 via a multi-bit bus 112, such as a 32-bit PCI (Peripheral Component Interconnect) bus. The EPG database 72 is shown connected to the PCI bus 112, but can alternatively be implemented as part of a hard disk drive 146. The programming data received at the receiver 50 is transferred over the PCI bus 112 to the EPG database 72. A decryption device (not shown) for facilitating secure access to the broadcast enabled PC may also be attached to the bus 112.

The viewer computing unit 60 has a video subsystem 114 connected to the PCI bus 112. The video and audio data is transferred from tuner 110 over PCI bus 112 to the video subsystem 114. The video subsystem 114 includes circuitry for decoding MPEG-encoded or other video data formats, although such circuitry can alternatively be incorporated into the tuner 110 or motherboard 100. The video subsystem 114 also includes video display drivers for driving a computer monitor 116.

The video subsystem 114 supports many peripheral devices, in addition to the monitor 116. For instance, the video subsystem 114 might be connected to a laser video player 118 for playing DVD (digital video disks), a game machine 120 for playing video games, and a VCR (video cassette recorder) 122 for recording programs. The video subsystem 114 is adapted for connection to an analog broadcast television system 124 to receive conventional TV signals from cable television or RF broadcast television systems. This enables backwards compatibility to analog TV systems.

The monitor 116 is preferably a VGA or SVGA monitor as is customary for personal computers, as opposed to a standard television. In the illustrated implementation, the viewer computing unit 60 does not convert the television-related data into an NTSC (National Television System Committee) format. In this manner, the viewer computing unit 60 is able to produce television data having superior quality when displayed on the VGA monitor.

The viewer computing unit 60 also includes a second bus 130, such as an ISA (Industry Standard Architecture) bus, coupled to the mother board 100. An audio board 132 is coupled to the ISA bus 130 and serves as an interface with a number of audio output devices, such as conventional speakers. An amplifier may be coupled between the audio board and speakers if desired. The audio board is also coupled to the video subsystem 114 to receive decoded audio signals. The audio board 132 can be coupled to a stereo system 134, so that audio data can be output to the stereo system for enhanced sound and recorded.

A CD ROM drive 136 is coupled to the ISA bus 130. The audio output produced by the CD ROM drive 136 is passed to the audio board 132.

The viewer computing unit 60 includes a modem 138, such as a 14.4 or 28.8 kbps fax/data modem, coupled to the ISA bus 130. The modem 138 is connected to a conventional telephone line and provides access to public networks, including the Internet. The modem 138 can be used to access and download data and supplemental content directly from an independent service provider. Additionally, the modem 138 can be used for two-way communications with the content provider serving the programs over the DSS network. Viewer requests for programs can be transmitted over the back channel via the modem 138.

An input/output (I/O) adapter 140 is coupled to the ISA bus 130 to interface with numerous I/O devices, including a digital tape driver 142, a floppy disk drive 144, and a hard disk driver 146. A remote receiver 148 is also coupled to the I/O adapter 140 for receiving signals from the remote cordless keyboard 66 and remote control handset 68 in an IR or RF format. Alternatively, the keyboard and handset can be directly wired to the computer. The I/O adapter 140 further provides conventional serial ports, including a COM1 port 150, a COM2 port 152, and an LPT1 port 154. An IR transmitter (not shown) can be coupled to the COM1 port 150 to generate infrared signals to control electronic devices, such as stereo equipment, VCR, and the like. The computer 60 can also be hooked directly to these components.

The viewer computing unit 60 runs an operating system 160 which supports multiple applications. The operating system 160 is loaded in memory 106 and executes on the processor 102. The operating system 160 is preferably a multi-tasking operating system which allows simultaneous execution of multiple applications. The operating system 160 employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. The remote keyboard 66 and handset 68 may include customized keys suitable for use with a Windows® brand operating system. It is noted, however, that other operating systems which provide windowing environments may be employed, such as the Macintosh operating system from Apple Computer, Inc. and the OS/2 operating system from IBM.

A channel navigator application 162 is stored in program memory 106 and executes on the processor 102 to control the tuner 110 to select a desired channel for receiving the video content programs. An EPG application 164 is stored in program memory 106 and executes on the processor 102 to organize programming information downloaded from the Program information server at the content provider and cached in the EPG database 72. The EPG 104 supports a displayable user interface (UI) which visually presents the programming information from the EPG database 72 in a usable format for the viewer, as will be described below with reference to FIG. 6. The EPG is also configured to enable the viewer to define queries which intelligently identify and gather programs the viewer would like to see.

The viewer computing unit 60 has a browser 166 which is kept in memory 106 and dynamically loaded on processor 102 when needed to render content, such as a hypertext document, from an ISP or other content provider. The browser 166 can be implemented as a hyperlink browser, or more particularly, as an Internet Web browser.

It is noted that the operating system and applications can be stored on the hard disk driver 146, or other storage medium (floppy disk, CD ROM, etc.), and loaded into the program memory for execution by the processor.

It is further noted that the broadcast enabled personal computer 60 is a fully functional computer which can perform the typical desktop applications familiar to computers. A variety of different applications can be loaded and executed on the viewer computing unit. As an example, the viewer can run word processing applications, spreadsheet applications, database applications, scheduling applications, financial applications, educational applications, and so forth. The viewer operates the applications using the keyboard 66.

Figure 6:
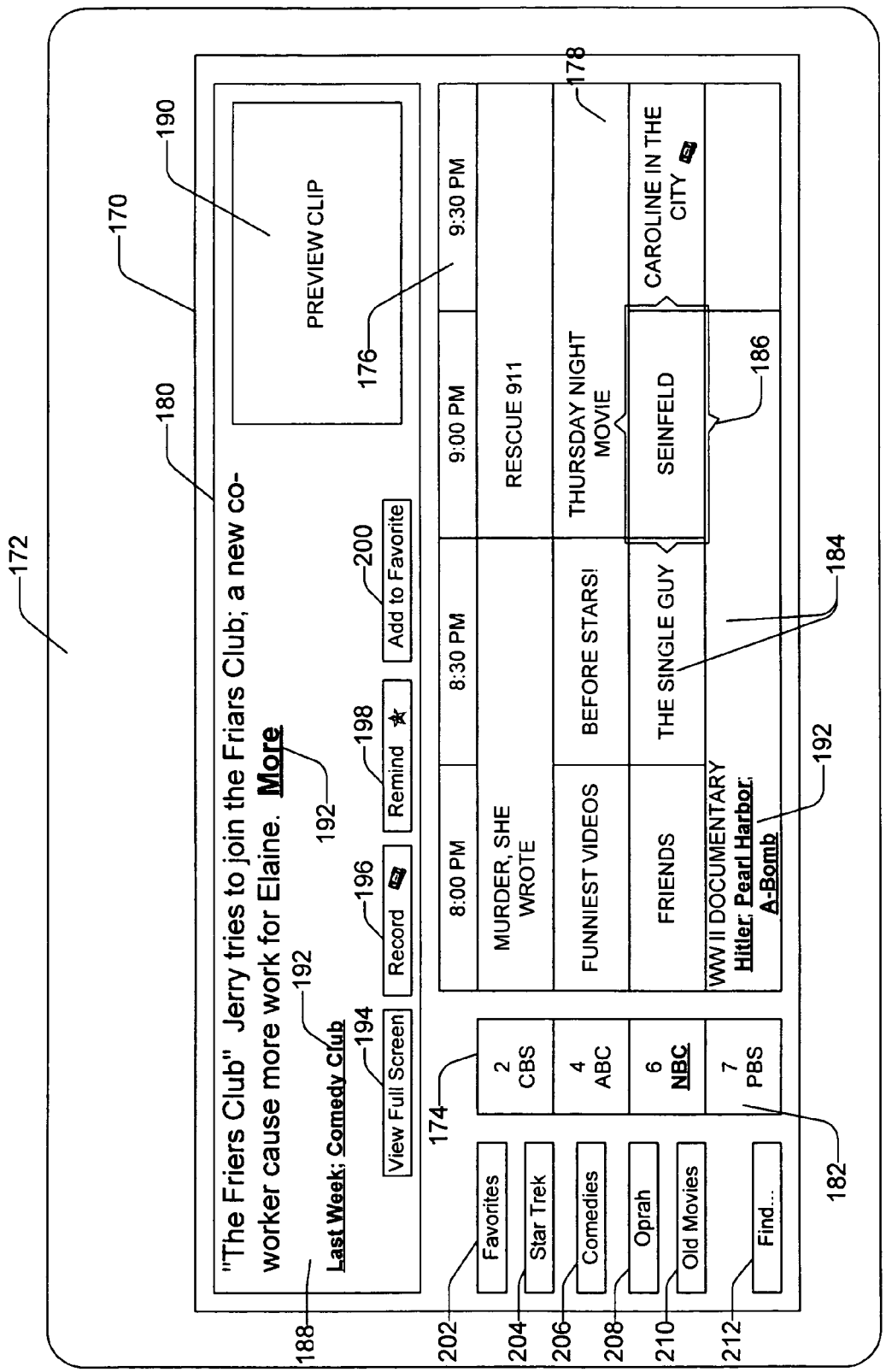
FIG. 6 is an exemplary screen illustration of an EPG UI, and particularly, a screen having a scrollable grid with program listings.

FIG. 6 shows an example EPG UI 170 which is presented on a display 172. The EPG UI 170 includes a channel panel 174, a time panel 176, a program grid 178, and a program summary panel 180. Channel panel 174 provides a vertical scrolling list which displays multiple channel tiles 182 at any one time. Each channel tile 182 includes a channel number and a channel name (typically the network name, such as CBS, ABC, MTV, etc.), and might also include a channel logo. The channel panel 174 defines rows of program titles in program grid 178. Time panel 176 is a horizontal, continuous scrolling time line with markings denoting half-hour time segments. Time panel 176 defines columns in program grid 178.

Program grid 178 consists of multiple program tiles 184 organized in channel-based y-axis and time-based x-axis. The grid is located to the right of channel panel 174 and below time panel 176. Each program tile 184 has the program title and any secondary program descriptive information, such as closed caption, stereo, etc. The illustrated screen shows an example programming line-up for 8:00 p.m. to 10:00 p.m. PST, Thursday, Mar. 7, 1996. The program titles, such as "Murder, She Wrote" and "Friends," are arranged horizontally with respect to their networks CBS and NBC and vertically with respect to their start times of 8:00 p.m. PST. It is noted that many other grid or non-grid layouts may be employed to present the program selections to the viewer. Additionally, although the layout is shown organized according to channel number, the same information can be presented in a channel absence presentation where no reference is made to is channel numbers.

The viewer controls the program selection with a single focus frame 186 which is graphically overlaid on the program grid 178. Focus frame 186 can be moved up or down, or left and right within a channel line-up, to choose a desired program. The remote control handset or keyboard (or other manipulating mechanism) can be used to position the focus frame 186 within the EPG UI 170.

Program summary panel 180 includes a text description window 188 and a preview window 190. The text description window 188 displays program information related to the program that is highlighted by the focus frame 186 in program grid 178. Here, the NBC program "Seinfeld" is highlighted and the text description window 188 lists the program title "Seinfeld," and a program description of the current episode. The text description window 188 might also include other program related information like closed-captioning, stereo, etc. The preview window 190 is used to display clips of the selected highlighted show, such as a preview of the "Seinfeld" show.

Figure 1:
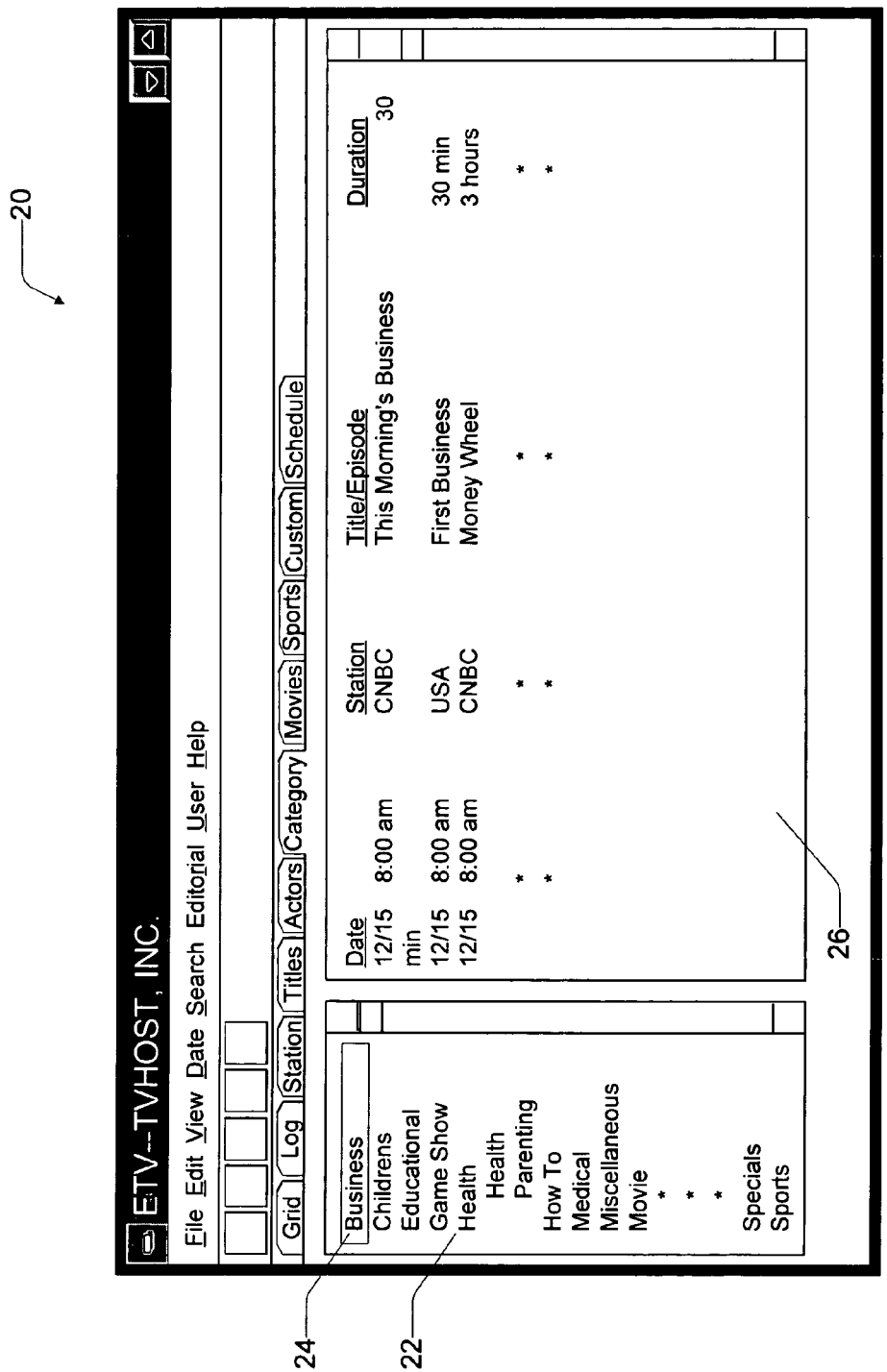
FIG. 1 is an exemplary screen illustration of a graphical user interface (UI) window presented by a prior art product which organizes programs into predefined categories.
Figure 2:
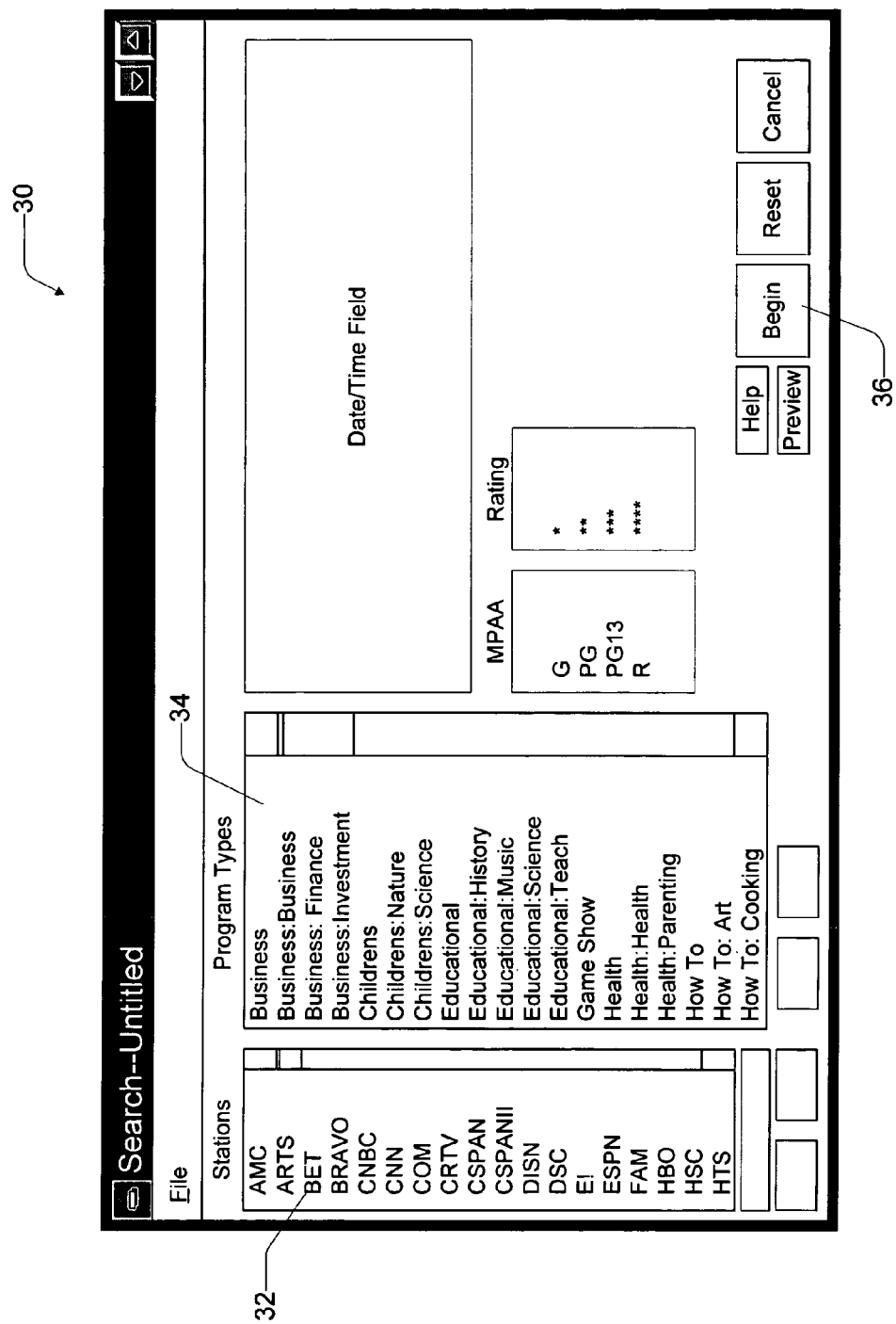
FIG. 2 is an exemplary screen illustration of a graphical user interface (UI) window presented by the prior art product which assists a viewer in searching the predefined categories to locate certain kinds of programs.

The data to fill the various tiles and windows is drawn from the EPG database 72 or from URL resources on the Internet 94. The data is maintained in data structure 88 (FIG. 2) which is transmitted as program records from the content provider over the satellite network to the viewer computing unit and cached in the EPG database 72. The EPG application 164 inserts the appropriate data records into the EPG UI 170 for display as the viewer maneuvers the focus frame 186 around the grid.

The EPG UI 170 also includes hyperlinks 192 which are supplied with the program records received from the content provider, embedded in the program stream, or provided in a data stream from arbitrary source which has been associated with the program. The hyperlinks can be inserted into the channel tiles 182, program tiles 184, or the description window 188. In the FIG. 6 illustration, the hyperlink "More" is provided in the description window 188 to reference target resources that contain additional information about this episode of the "Seinfeld" show. Other hyperlinks in the description window 188 include "Last Week" which references a target resource containing information on the previous week episode, and "Comedy Club" which links to a target resource having video coverage of comedian Jerry Seinfeld performing at night clubs. The target resources referenced by the hyperlinks might be located at the content provider or at an independent service provider. The target resource might further be located locally, having been pre-cached by the system. For instance, the system might pre-cache supplemental information about certain shows before they air based on predictive viewing tendencies, or as part of a promotional data broadcast advertising the show. This permits local interactive functionality between the viewer and the viewer computing unit, in addition to full network interactive functionality between the viewer and the program provider.

The EPG UI 170 has special operator buttons 194-200 which arrange for certain tasks. A "view full screen" button 194 allows the viewer to view the program in full screen. A "record" button 196 allows a user to initiate procedures to record a currently playing program, or schedule to record an upcoming program. For scheduling, the viewer simply drags the record icon and drops it on a program tile 184 of an upcoming program, as exemplified by the record icon dropped on the "Caroline in the City" program tile.

A "remind" button 198 is used to set reminders which notify viewer's of scheduled shows. A viewer might, for example, want to be reminded of a program being played later in the day and hence, drag a reminder icon to the suitable program tile 184. When the start time of the requested program approaches, the EPG will notify the viewer through a pop-up icon or the like that the program is about to begin. An "add to favorite" button 200 is provided to enable a viewer to add a program to a predefined list of favorites.

The drag and drop aspects described above are preferably implemented using object linking and embedding (OLE), which is commercially available from Microsoft Corporation under a technology known as "ActiveX." OLE is an extensible service architecture built on the Component Object Model (COM) which is both language independent and location independent. OLE supports an OLE Drag and Drop which is widely used in Windows®-compatible operating systems, such as Windows® 95. OLE and COM have been well documented and will not be explained in detail. For more information regarding OLE and COM, refer to *OLE 2 Programmer's Reference* and *Inside OLE 2, Second Edition*, both published by Microsoft Press of Redmond, Wash., and both of which are hereby incorporated by reference.

The EPG UI 170 also presents predefined query buttons 202-210. Activation of these query buttons trigger a query of the EPG database 72 to identify programs satisfying the predefined query parameters. The EPG 106 enables a viewer to create their own queries and to produce a soft button on the EPG UI 170 for quick retrieval of highly used queries. As an example, the EPG UI shows queries for favorite programs, Star Trek programs, comedies, the Oprah Show, and old movies. The "favorites" query button 202 recalls a list of programs that the viewer has previously identified as favorites using the "add to favorite" button 200, or which have been automatically defined as favorites by the EPG. The "Star Trek" query button 204 and "Oprah" query button 208 initiate queries of the EPG database 72 for all Star Trek and Oprah shows that might be playing within a particular time frame. As the number of channels increases and programming grows dramatically, several different channels might carry Star Trek or Oprah, concurrently or at different times. The "comedies" query button 206 initiates a query of the EPG database 72 for all comedy programs. The "old movies" query button 210 locates all old movies that are showing.

Some of the predefined query buttons are preset categories, such as the "comedies" and "old movies" buttons, while other query buttons are defined by the viewer, such as "Star Trek" and "Oprah" buttons. The preset category buttons can be added and removed from the EPG UI through a separate window which allows a viewer to add or subtract categories from a list of available categories.

According to one aspect of this invention, the EPG 164 is configured to automatically develop queries to identify programs that a viewer is likely to want to watch based on viewing preferences of the viewer. The EPG application collects viewer preferences in a number of ways. One technique is to log the amount of time that each channel is selected for viewing, with the underlying assumption that the viewer is watching that channel. Each channel is then assigned its own percentage of the entire viewing period as an indication of the viewer's preferences. The EPG generates a query to identify channels based upon this percentage, so that channels which the viewer tends to watch most often appear at the top of the list and channels which the viewer tends to watch least often appear at the bottom of the list. The EPG presents this list as a scrollable list in the EPG UI, with the highly watched channels appearing at the top and the least watched not appearing at all, but being available if the viewer wanted to scroll to them. It is noted that the same technique can be applied to individual programs or networks, where each program or network (rather than channel) is logged and the list is ordered with the frequently watched programs being listed on top and the least watched programs being listed on the bottom.

Another technique is to create a viewer profile for each viewer. The viewer is asked a series of questions directed at discovering the viewer's likes and dislikes. This question-and-answer session is accomplished using a separate graphical UI which asks questions and enables viewers to choose among responses, such as "strongly like," "like," "dislike," and "strongly dislike." Rather than discrete answers, the question-and-answer screen might include sliders which enable viewers to choose somewhere in a scale between opposing preferences of "strongly dislike" and "strongly like." The EPG compiles the viewer profile and correlates the profile with clustering data to generate a query for possible programs. The clustering data represents an accumulation of other viewers preferences. By matching the viewer profile with similar profiles, the EPG can better determine what the viewer will most likely want to watch.

Once the EPG 164 has automatically compiled a list of likely favorites, the EPG presents the list in a UI screen. This screen can be called, for example, by activating the "favorites" button 202 in EPG UI 170. The list is presented as its own reduced, closed loop of available programs which has actively weeded out less popular channels. The viewer can then surf the closed list by sequentially cycling through the programs.

Figure 7:
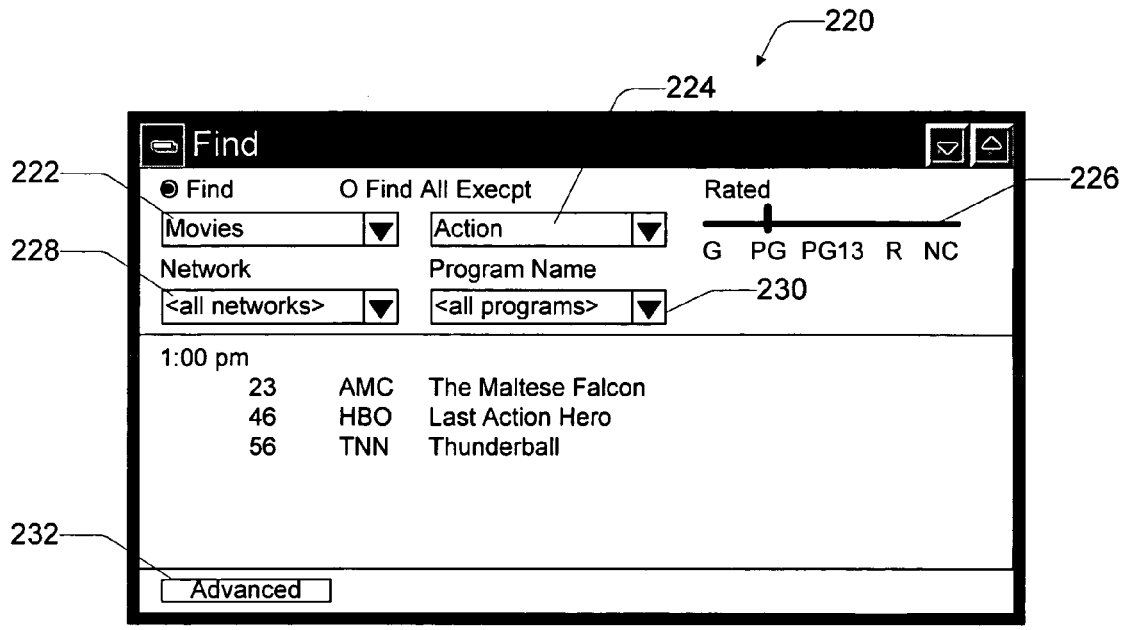
FIG. 7 is an exemplary screen illustration of an EPG UI, and particularly, a screen used to help create simple queries for searching the EPG.

The EPG UI 170 also presents a "Find" button 212 which a viewer uses to create his/her own query. Activation of the "Find" button 212 opens another UI window which assists a viewer in creating a query. FIG. 7 shows an example find window 220. The find window 220 presents various search parameters for the viewer to search. In this example, the viewer can select a program genre from a genre box 222, a program sub-genre from a sub-genre box 224, a rating from the rating scale 226, a network name from the network box 228, and a program name from the program box 230. Based on these parameters, the EPG constructs a query and searches the EPG database 72 to locate programs satisfying the query. The find window supports creation of two mutually exclusive types of queries: a "find" query which locates all programs satisfying the search parameters and a "find all except" query to locate all programs which do not satisfy the parameters. In this example, the EPG has constructed a "find" query which located three programs that satisfy the parameters of an action movie rated PG.

Figure 8:
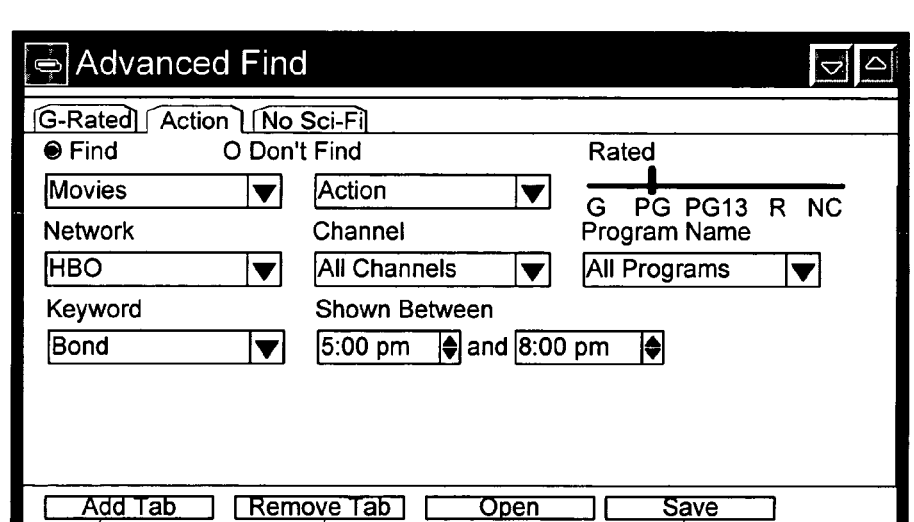
FIG. 8 is an exemplary screen illustration of an EPG UI, and particularly, a screen used to help create more advanced queries for searching the EPG.

To produce more advanced queries, the viewer can select an advanced query button 232. FIG. 8 shows an example advanced find window 240. It enables a viewer to create particularized queries and organize them in a tabbed folder arrangement. In this example, the viewer has defined three advanced queries pertaining to "G-rated" programs, "Action" programs, and "No Sci-Fi" programs. The advanced find window 240 includes parameters such as genre, sub-genre, rating, network name, channel, program name, and time period. As new parameters are added to the EPG database, new controls in the advanced find window 240 are likewise added. It also allow a viewer to define a keyword. In this example, the viewer wants to find all James Bond action movies on HBO between 5:00 PM and 8:00 PM. Hence, the viewer enters the keyword "Bond" and executes the query. If the viewer wanted to find a particular bond movie starring Sean Connery, the viewer might enter a Boolean-like search "Bond AND Connery" in the keyword control of the advanced find window.

The advanced find window 240 can also be used to create restrictive queries which function to restrict or limit selection of programs for viewers without appropriate permissions levels. For instance, parents can set permission levels for their children so that when the children are logged onto the viewer computing unit, the children are prevented from watching certain programming content or from ordering certain services. A parent might, for example, wish to restrict a child from watching an R or NC rated movies. To create a restrictive query, the parent clicks the "don't find" option to convert the query from an inclusive query to an exclusive query.

An "add tab" button 242 and "remove tab" button 244 allow the viewer to manage the queries. The viewer can also save queries by clicking on the "save" button 246. Preferably, the queries are saved in a hierarchic query structure of the EPG database. This enables viewers to define directories and sub-directories of queries. Organizing queries in a hierarchic structure is advantageous because the structure conforms to the computer side of the viewer computing unit and avails itself to memory management applications and tools running on the computer. As the number of saved queries grow, the query directories can be searched like other data files directories, as is common in personal computers, to locate a particular query. The query structure can also be presented in a UI to the viewer as an organization chart showing the hierarchy of directories, sub-directories, and queries. Individual queries can be saved as icons. To recall the query, the user activates the icon.

The EPG can also be configured to support a query editor to allow the viewer to create essentially any type of query based on key word descriptions, and to edit such queries. One suitable type of editor which can be employed with the EPG is a query editor used in a program entitled Cinemania95 by Microsoft Corporation, which enables a computer user to create queries for locating cinema trivia stored on the CD ROM.

To assist the viewer in defining a query (either by using the "Find" UI or the query editor), the EPG can provide wizards which guide the viewer with step-by-step instructions through the query creation. One example wizard for generating a simple query is to ask the viewer if the program selected is chosen for its name, or for its channel. A viewer might request to always be shown any program with one name, or to never display a program with another name.

Once a query is defined, the viewer can execute the query to initiate a search of the programming information in the EPG database 72. The queries function as a filter which sifts through the programming information and returns only those items which satisfy the parameters, or in the case of a restrictive query, precludes those items that satisfy the parameters.

Figure 9:
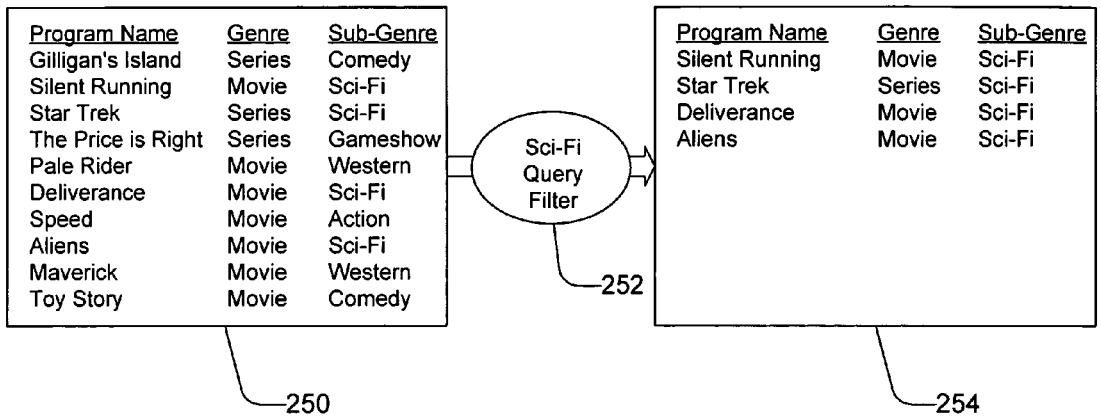
FIG. 9 is a diagrammatic illustration of how a query filters the program database of the EPG to identify programs satisfying the parameters of the query.

FIG. 9 is a diagrammatic illustration of how a query operates to filter out programs which do not satisfy the criteria. Box 250 contains a representation of programs found in the EPG database 72. Suppose a viewer defined a science fiction (Sci-Fi) query using the advanced find window 240, as shown in FIG. 8, to locate Sci-Fi programs. The EPG application 164 executes the Sci-Fi query 252 and winnows the program database to a short list of Sci-Fi programs, as presented in box 254. This short list of Sci-Fi programs is then presented in the UI as a closed loop list which can be cycled by the viewer for selection of a particular program.

Figure 10:
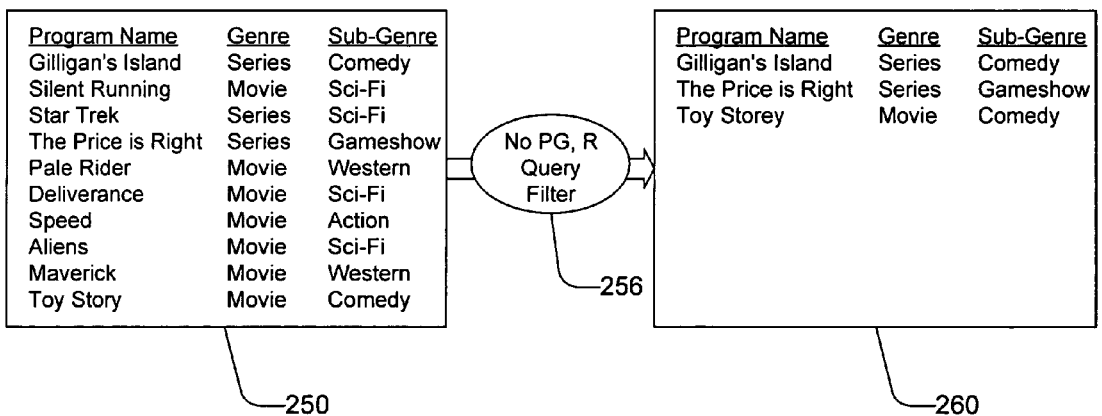
FIG. 10 is a diagrammatic illustration of how a restrictive query filters the program database of the EPG to identify and prevent programs satisfying the parameters of the query from being displayed.

FIG. 10 demonstrates a restrictive query which functions to filter out and remove programs which are prohibited under the query. In this example, the EPG applies a restrictive query filter 256 to the program set 250 in the EPG database which eliminates programs rated PG or R. The short list provided in box 258 is without PG or R rated programs.

Figure 11:
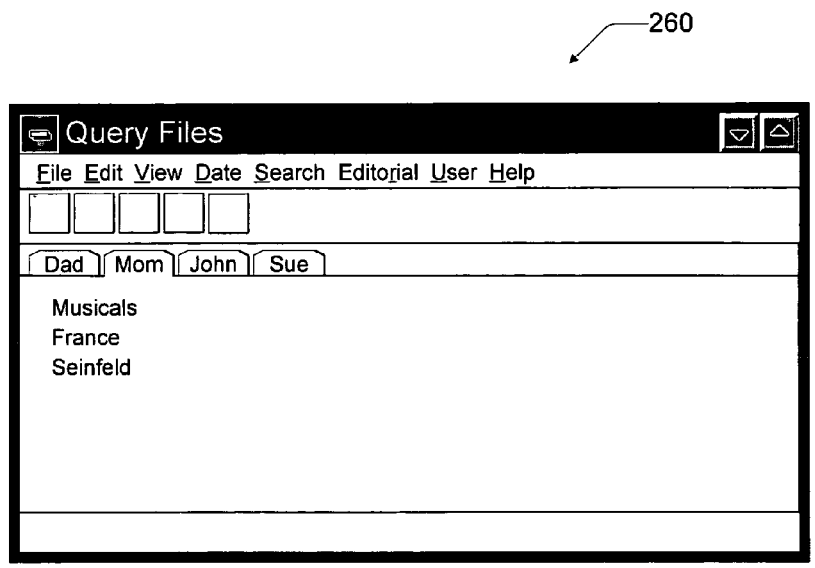
FIG. 11 is an exemplary screen illustration of an EPG UI, and particularly, a screen used to manage queries for multiple viewers.
Figure 12:
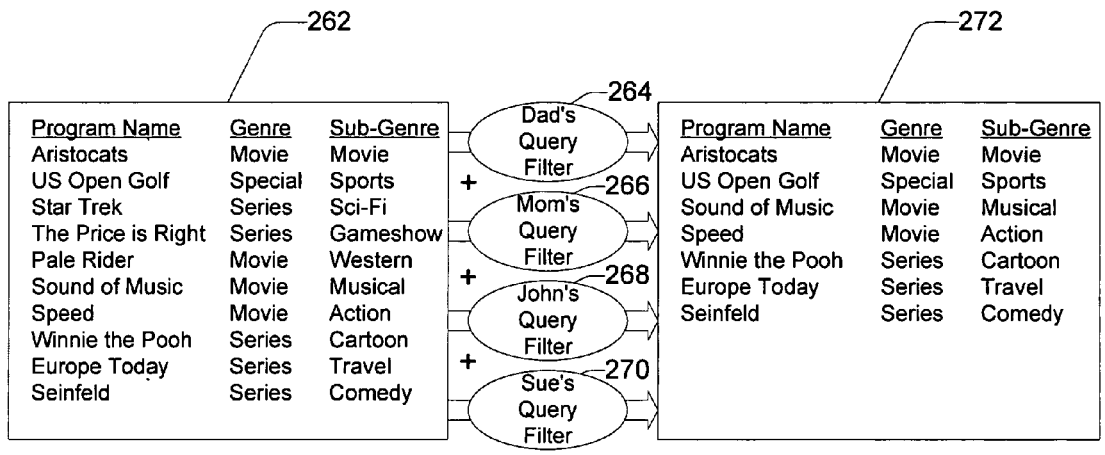
FIG. 12 is a diagrammatic illustration of how individual queries can be merged into a composite query used to search the program database of the EPG.

FIGS. 11 and 12 illustrate another aspect of this invention in which the EPG is configured to merge multiple queries into a unified query. Suppose, for example, that multiple members in a family want to watch a program together, but are not sure which program. Typically, each family member individually scans the program listings, or surfs the channels, to find one or two programs they are most interested in watching. After everyone is through with his or her independent search, they discuss about which program to watch. The EPG 164 eliminates this problem by creating complex composite queries which merge multiple simple single queries.

FIG. 11 shows an example UI window 260 having a folder organization which maintains queries for individual viewers. In this example, a family of four—Dad, Mom, John, and Sue—each have their own tab and folder which lists their personalized queries. That is, each family member has previously defined one or more queries and stored them in their personal folder. The Mom folder holds queries for musical programs, programs on France, and the Seinfeld program. Table 1 shows the queries for all family members.

TABLE 1

Family Queries

| Family Member | Queries |
| --- | --- |
| Dad | Sports, Comedies |
| Mom | Musicals, France, Seinfeld |
| John | Star Trek, Action |
| Sue | Cartoons, No R-rated |

When the family sits down to watch a program together, one viewer can execute a merge query that effectively combines these independent queries using, for example, an OR function. The Boolean OR function returns a true result if any one of the parameter sets is met. In FIG. 12, a program set 262 is filtered using Dad's query filter(s) 264, Mom's query filter(s) 266, John's query filter(s) 268, and Sue's query filter(s) 270. The programs satisfying at least one of these queries is placed in the program pool 272, from which the family members can choose a program. It is noted that the family filter can be alternatively set to combine using a set intersect method or Boolean AND function which returns a program only if the query parameter sets of each family member is met.

Notice that some programs are listed because they satisfy a single query (e.g., US Open Golf is selected by Dad's query filter 264). Other programs may satisfy more than one query. For example, the program "Seinfeld" satisfies Mom's Seinfeld query and Dad's comedies query. The animated movie "Aristocats" satisfies Mom's France query and Sue's cartoon query.

Figure 13:
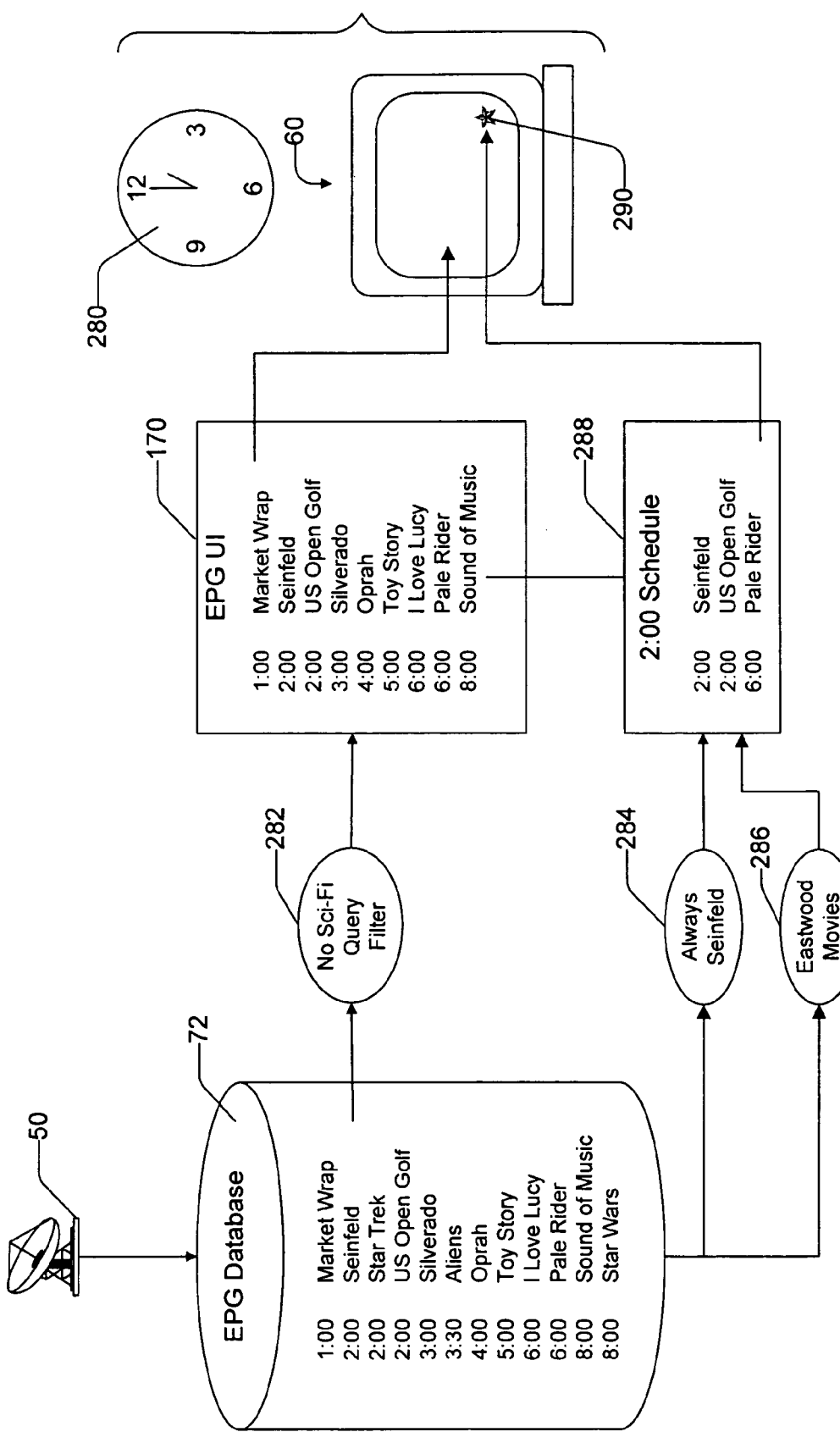
FIG. 13 is a diagrammatic illustration of how program information is filtered through multiple queries to provide a short set of programs that are ultimately displayed to the viewer.

FIG. 13 illustrates the data flow for the programming data used by the EPG application, and how the query filters act to pare the data. Suppose that the viewer is watching the viewer computing unit 60 at 1:00 PM, as indicated by the clock 280. Broadcast digital video and audio data, along with the digital programming data, are received from the satellite system at satellite receiver 50. The programming data is cached in the local EPG database 72. In this illustration, the is EPG database is shown as having twelve programs with start times ranging from 1:00 PM to 8:00 PM. This represents a tiny fraction of available programs, as the EPG database 72 can store thousands of programs that are available over hundreds to thousands of channels.

The viewer has defined a restrictive query 282 that removes all Sci-Fi programs from the active EPG UI 170. In this case, the programs "Star Trek," "Aliens," and "Star Wars" are eliminated from the EPG UI 170. Now, suppose the viewer decides to watch CNBC Market Wrap at 1:00 PM. The viewer selects the program by highlighting and clicking on the Market Wrap program tile in the EPG UI 170. The tuner in the viewer computing unit tunes to the channel carrying the selected program and the digital video data for Market Wrap is sent to the VGA monitor.

According to another aspect of this invention, the viewer can define queries that continue to execute in background. The viewer defines the query to identify a topic of interest, such as any programs concerning the Great Wall of China or any programs starring Clint Eastwood. The query is stored and periodically executed to determine if there are any programs which relate to the topic. When the query identifies a program related to the topic, the EPG automatically notifies the viewer.

FIG. 13 shows two queries that execute in background. The first query 284 identifies and notifies the viewer of all "Seinfeld" programs and the second query 286 identifies and notifies the viewer of all Clint Eastwood movies. When the viewer looks at the upcoming schedule for 2:00 PM, the EPG UI 288 shows all programs from the filtered version of the EPG UI 170 which show at 2:00 PM, such as the US Open Golf and Seinfeld. The EPG UI 288 also shows any is programs identified by the background queries as a result of searching the EPG database 72. Here, the background queries 284 and 286 identified a Seinfeld program playing at 2:00 PM and a Clint Eastwood movie "Pale Rider" at 6:00 PM. Since there is a conflict at 2:00 PM, the viewer can choose between the Seinfeld program and the US Open Golf program.

Since the movie Pale Rider is not until 6:00 PM, the viewer can place a notification icon 290 on the screen to remind him/her of the program. The viewer clicks on the program, drags it from the EPG UI 288, and drops it at another location on the screen. The drag-and-drop operation results in creation of an instruction to tune the visual display unit to the program upon activation of the icon. The EPG can flash the icon, or cause some other visual change, when the start time of the program nears.

The EPG can also automatically create these reminders, without intervention of the viewer. When the EPG identifies a program, such as Pale Rider in response to the background query 286, the EPG can be configured to automatically set an icon 290 on the screen for the viewer. The viewer can also set an option for the EPG to initiate recording of the program in the event that the viewer does not timely activate the icon prior to the scheduled viewing time. In this manner, if the viewer is unable to watch the program at the schedule time, the EPG intelligently queries the database for upcoming programs, identifies any programs that meet the viewer's search parameters, notifies the viewer, and records the program if the viewer is unable to watch it. There are other triggerable events that may be set based on the queries, such as automatically downloading information about the identified program, calling particular content from the Web, or launching a purchasing application to purchase goods related to the identified program.

This example illustrates concurrent use of multiple filters including personal background filters and an active general filter. The EPG can be configured to perform any number of queries, such as any restrictive queries for the logged on viewers, then any general queries, and then any background queries to filter the programs found in the EPG database to a manageable set of preferred programs.

Another aspect of this invention is to provide queries which filter information from the EPG database and from one or more Web sites on the Internet. The query results can be presented to the user in a single UI. The queries for the Web sites or other information on the Internet can be active queries that readily filter during online communication with the Internet, or queries that filter information in a local cache filled with Internet data.

Figure 14:
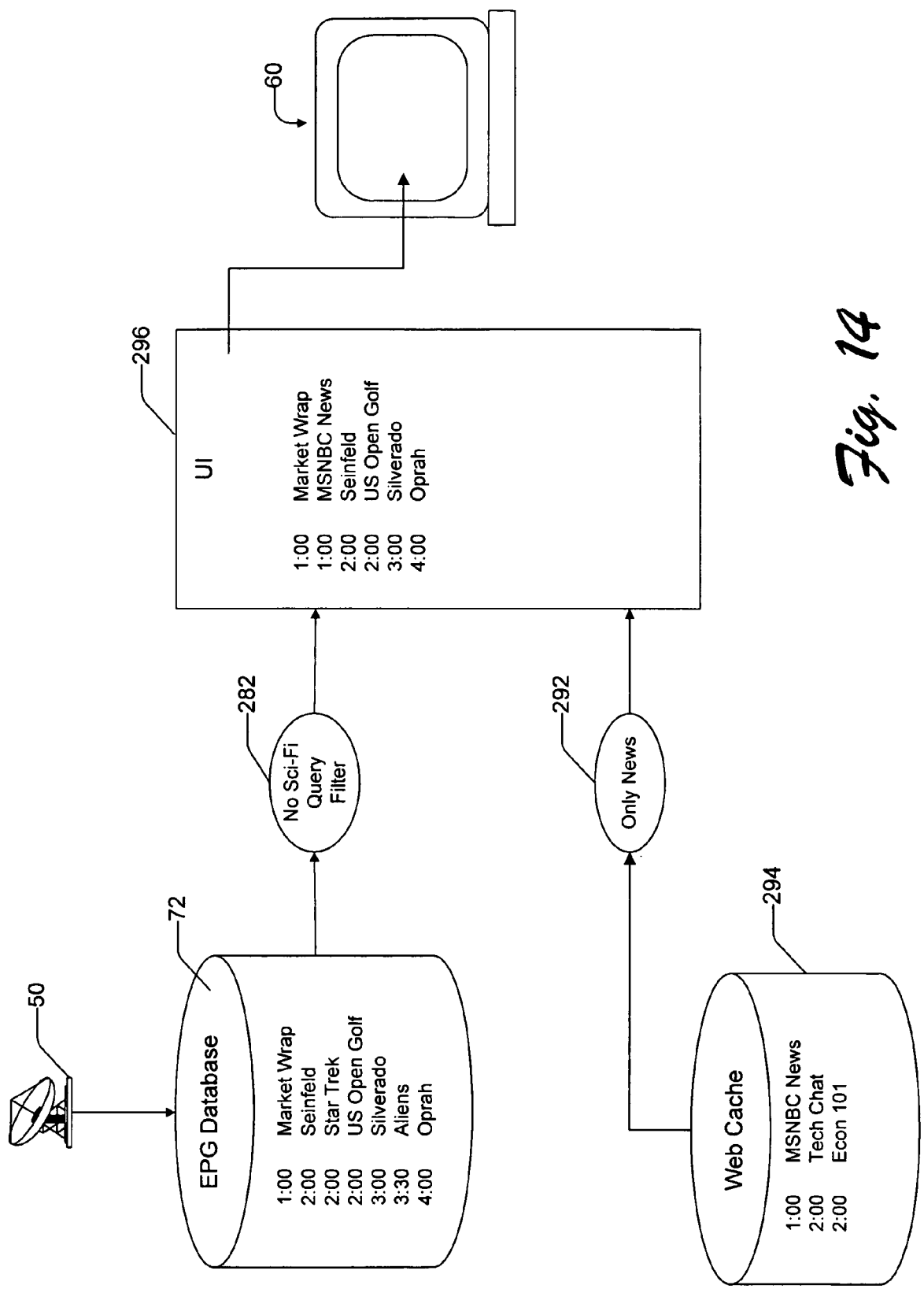
FIG. 14 is a diagrammatic illustration of how program information in an EPG database and other content information in a Web cache are filtered using multiple queries to provide a short set of programs that are ultimately displayed to the viewer.

FIG. 14 is similar to the arrangement of FIG. 13, but shows the effect of queries operating on both the EPG database and an Internet Web site. FIG. 14 shows two queries, an EPG database query 282 which filters data in the EPG database 72 to remove all science fiction programs and a Web cache query 292 which filters a Web cache 294 to locate only news programs. The Web cache 294 contains recently retrieved from one or more Web sites on the Internet.

The results of the two queries are displayed together on UI 296 to present a list of options to the viewer. The viewer can optionally select programs served by the content provider over the primary distribution network, or content served by the Internet provider over the Internet. By using an integrated UI 296, the viewer might be unaware as to the source of the content.

Figure 15:
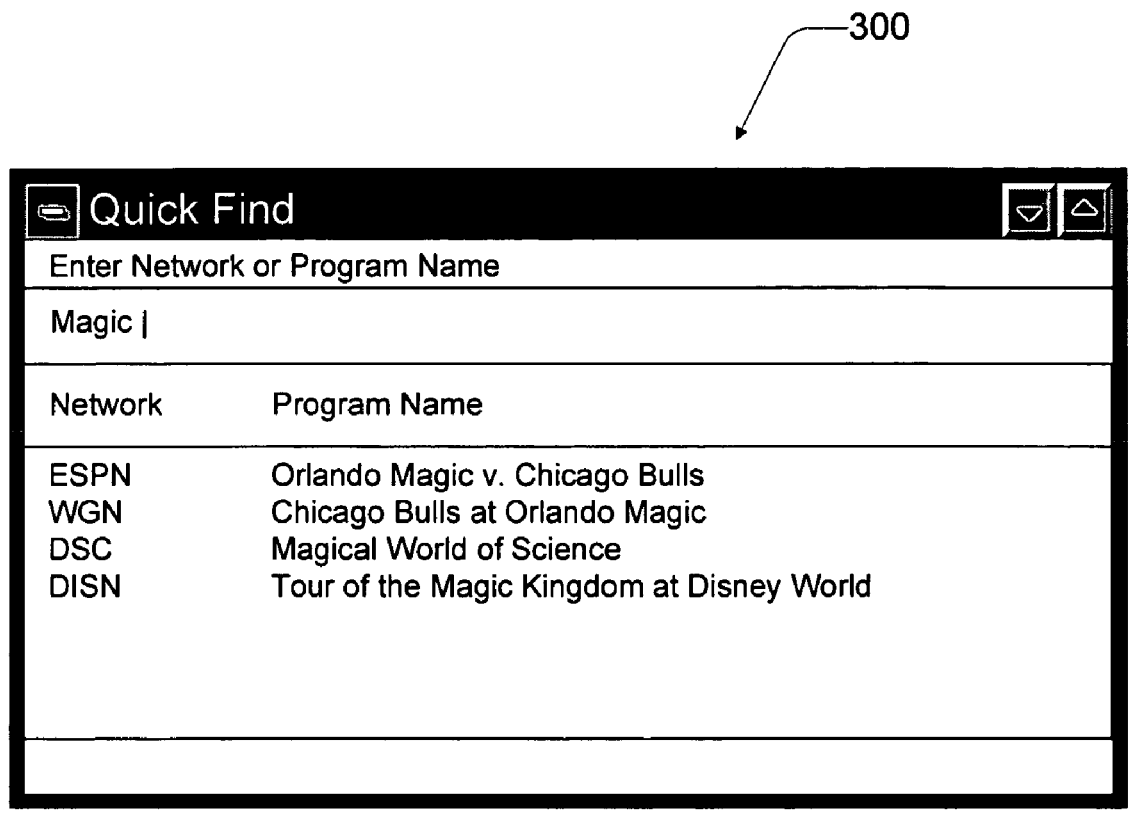
FIG. 15 is an exemplary screen illustration of an EPG UI, and particularly, a screen used to locate a particular channel, network name, or program name and to create queries which search for them simultaneously.

FIG. 15 shows a quick find window 300 supported by the EPG application 164 which presents another technique for creating a query. This technique enables a viewer to enter data from a numeric keypad on the remote control handset. The numeric keypad is a conventional 0-9 digit keypad. Numbered keys 2-9 also have letters associated with them, similar to a conventional telephone, except the number "7" key includes the letter Q and the number "9" key includes the letter Z. Table 2 shows the association of the numbered keys and letters.

TABLE 2

Association of Letters to Numbered Keypad

| Key | Associated Letters |
| --- | --- |
| 1 |  |
| 2 | A, B, C |
| 3 | D, E, F |
| 4 | G, H, I |
| 5 | J, K, L |
| 6 | M, N, O |
| 7 | P, Q, R, S |
| 8 | T, U, V |
| 9 | W, X, Y, Z |
| 0 |  |

Suppose a viewer wants to watch a particular program or network, but cannot remember what channel it is on. Remember, there are expected to be hundreds or thousands of channels, and trying to locate a particular program or network by memorizing each channel number may prove futile. To decouple the association of channel numbers to networks and programs, the EPG enables the viewer to enter data from the 10-key keypad for both channel numbers or letters in the program or network name. The EPG performs the mapping to identify any program, channel, or network that matches the entered data.

The quick find window 300 is activated by pressing one of the keys on the remote control handset. With quick find active, the viewer presses individual keys on the remote control handset to enter data, one digit at a time. As each key is depressed, however, the EPG does not know if the viewer intends to enter a number or a letter. Accordingly, for each key, the EPG constructs a query which interprets the data as possibly representing a number or one of the letters associated with the numeric key. The EPG then executes the query to identify any EPG data item (i.e., channel, program, network, etc.) that satisfies the query. As the viewer continues to enter digits, the EPG constructs and executes queries to continuously narrow the list until only a few EPG data items satisfy them.

With reference to the example shown in FIG. 15, suppose the viewer is interested in watching the Orlando Magic basketball team. The viewer activates the quick find window 300 and begins entering the word "Magic." The viewer first depresses the "6"-key, which has the associated letters M, N, and O, to enter the letter "M" in "Magic." The EPG constructs a query for all EPG items beginning with the digit "6," "M,", "N," or "O." In Boolean logic terms, the query is represented as follows:

Query 1=6* or M* or N* or O*

The symbol "*" means that any digit or digits can follow the number or letter shown. The query returns a long list of items, including the following examples:

Query 1: 6* or M* or N* or O*

MTV
Chicago Bulls at Orlando Magic
Seattle Mariners v. Boston Red Sox
Market Wrap
Magical World of Science
Magic Kingdom at Disney World
Orlando Magic v. Chicago Bulls
Nashville Live
NBC
Nick-at-Night
Outer Limits
Oprah
Channel 6
Channel 61
:
:

The viewer next depresses the "2"-key, which has the associated letters A, B, and C, to enter the letter "a" in "Magic." The EPG constructs a query for all EPG items in the first list having a next digit beginning with "2," "A,", "B," or "C." In Boolean logic terms, the query is represented as follows:

Query 2=62* or MA* or MB* or MC* or NA* or NB* or NC* or OA* or OB* or OC*

The query returns a shorter list of items, including the following examples:

Query 2

Chicago Bulls at Orlando Magic
Seattle Mariners v. Boston Red Sox
Market Wrap
Magical World of Science
Magic Kingdom at Disney World
Orlando Magic v. Chicago Bulls
Nashville Live
NBC
Channel 62
Channel 621
:
:

The viewer next depresses the "4"-key, which has the associated letters G, H, and I, to enter the letter "g" in "Magic." The EPG constructs a query for all EPG items in the first list having a next digit beginning with "4," "G,", "H," or "I." In Boolean logic terms, the query is represented as follows:

Query 3=624* or MAG* or MAH* or MAI* or MBG* or MBH* . . . or OCG* or OCH* or OCI*

The query returns a much shorter list of items, including the following:

Query 3

Chicago Bulls at Orlando Magic
Magical World of Science
Magic Kingdom at Disney World
Orlando Magic v. Chicago Bulls
Channel 624

By entry of the third digit—the letter "g"—the list of possible programs, networks and channels has been dramatically reduced to a short list that can be presented to the viewer. If the viewer continues to enter the letters "i" and "c" in "Magic," the list is pared down to four items shown in the quick find window 300 in FIG. 15. The viewer can then choose a program from the list by clicking on the appropriate program title. In response, the viewer computing unit tunes to the channel carrying the selected program.

An alternative technique to searching on each number or letter is to pre-map the program and network names into associated identification numbers which can be stored as part of the data record in the EPG database. For instance, the network name MTV has an associated identification number "688," where the letter "M" is mapped to the number "6," the letter "T" is mapped to the number "8," and the letter "V" is mapped to the number "8." With this pre-mapped identification number, the EPG can simply search on each numerical data and return all channel numbers, and all programs with identification numbers satisfying the query.

The quick find feature is very useful to the viewer. The viewer need not use the remote keyboard to enter names of programs or networks (although the keyboard may be used). Instead, the viewer enters the data using the 10-key keypad on the remote control handset and the EPG simultaneously considers all possible meanings of the data. Although this may seem laborious, entry of just a few digits (e.g., 3 to 6) is often sufficient to reduce the set of possible channel numbers, programs, and network names to only a few which can be conveniently displayed to the viewer.

The quick find feature is described above as performing a new set of queries after each digit is entered. However, the EPG can be alternatively configured to await entry of multiple digits before performing the queries. For instance, the EPG can keep track of the sequence of entered digits, and the various permutations of possible letter combinations within the sequence, and then Subsequently perform queries on those possibilities.

It is noted that the above example describes the viewer as entering data using a keypad on the remote control handset. In other embodiments, the EPG is configured to present a keypad of soft buttons (i.e., buttons shown as part of the graphical UI on the monitor) which the viewer can select using a handset or some other remote device to enter the data. Additionally, the viewer can enter channel numbers, program names, and network names using the remote keyboard.

It is noted that the term "program" is represented in examples as traditional television shows, or movies. The term "program" is not to be limited, however, to only these forms of programming. The term "program" is to be given a broad meaning, including any type of information or data that can be carried over a network or stored locally. Examples of "programs" include TV-like shows, movies, games, interactive supplemental data, financial records or programs, educational materials, communications records, software, document files, and the like.

The query-base EPG system described herein is advantageous because it effectively decouples the association of channel from network and programs. The viewer can create simple queries to search on prearranged categories or complex queries to search across arbitrary fields. The EPG permits viewers to merge their individual queries into a composite query, which offers tremendous convenience for groups of viewers. The EPG also permits a viewer to save queries in a convenient hierarchic structure. The saved queries can also be loaded into a start menu for execution each time the viewer boots the viewer computing unit.

The invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for operating an electronic program guide displaying television programming information, comprising the following steps:
displaying a user interface indicating television programming information comprising a plurality of channels, time periods and programs configured as a program grid comprising program tiles associated with programs, wherein a user can realize when and on what channel a program is offered by viewing a program tile associated with the program, and wherein the user interface implements recording and reminding functionality by providing icons configured to be dragged and dropped by the user into a program tile associated with any program, where the icons can be seen after being dropped, to indicate desire by the user to record the program or be reminded of the program, respectively;
generating a query, in response to activation by the user of a query generating button defined by the user interface, wherein the activation of the query generating button results in display of a find window of the user interface to assist the user in creating a query, wherein the query defines a search of an electronic programming guide database, wherein the user interface is configured to allow the user to save the query, and wherein the saving results in creation of a soft button, defined on the user interface, such that operation of the soft button allows a user to quickly retrieve and operate the saved query;
receiving search parameters from the find window, the parameters comprising: genre; network; rating; and program name;
displaying an advanced find window in response to selection of an advanced query button within the find window, wherein the advanced find window allows search by additional search parameters including keywords, wherein the advanced find window defines a plurality of user created searches, wherein a user created search may be saved by the user by associating the search with a tabbed folder, and wherein tabbed folders may be created and removed by operation of buttons within the advanced find window;
querying the electronic programming guide database using filters, comprising:
a filter finding program types desired by the user; and
a filter removing program types not desired by the user; and
unifying plural queries using a unified query function configured to combine queries of plural individuals into a unified query, wherein the combining is performed by a Boolean AND or OR function; and
operating the unified query function as a background query, the operating comprising:
periodically running the unified query function;
identifying a program according to the unified query;
displaying an icon on a screen, for view by the user, after identifying the program; and
recording the identified program if the user does not activate the icon prior to a viewing time of the identified program.

2. A method as recited in claim 1, further comprising the following steps:
presenting, to the viewer, a list of the channels identified by the query; and
ordering the channels within the list according to the percentage of time that the channels are selected for viewing so that channels which are selected a higher percentage of the time appear at one place in the list and channels which are selected a lower percentage of the time appear at another place in the list.

3. A method as recited in claim 1, further comprising the step of generating a query to identify channels which have been selected at least a threshold amount of time to eliminate rarely selected channels from identification.

4. An electronic program guide resident in a computer-readable storage device and executable on a processor to perform the steps of the method recited in claim 1.

5. A viewer computing unit programmed to perform the steps of the method recited in claim 1.

6. A computer-readable storage device which directs a computer to perform the steps of the method recited in claim 1.

7. A method for operating an electronic program guide displaying television programming information, comprising:
displaying a user interface indicating television programming information comprising a plurality of channels, time periods and programs, wherein a user can realize when and on what channel a program is offered by viewing a program tile associated with the program, and wherein the user interface implements recording and reminding functionality by providing icons configured to be dragged and dropped by the user into a program tile associated with any program, wherein the icons can be seen after being dropped, to indicate desire by the user to record the program or be reminded of the program, respectively;
generating a query, in response to activation by the user of a query generating button defined by the user interface, wherein the activation of the query generating button results in display of a find window of the user interface to assist the user in creating a query, wherein the query defines a search of an electronic programming guide database, wherein the user interface is configured to allow the user to save the query, and wherein the saving results in creation of a soft button, defined on the user interface, such that operation of the soft button allows a user to quickly retrieve and operate the saved query;
presenting a list of programs to the user, wherein the presented list is obtained by searching comprising:
obtaining data from a 10-key keypad such that each of 26 letters is associated with one key of the 10-key keypad;
iteratively searching for programs having sequential letters in a word in a title of the program corresponding to corresponding sequential keystrokes of the 10-key keypad; and
presenting the user, upon each iterative search, with successively shorter lists of programs from which to select a desired program;
displaying an advanced find window in response to selection of an advanced query button within the find window, wherein the advanced find window defines a plurality of user created searches, wherein a user created search may be saved by the user by associating the search with a tabbed folder, and wherein tabbed folders may be created and removed by operation of buttons within the advanced find window;
unifying plural queries using a unified query function configured to combine queries into a unified query, wherein the combining is performed by a Boolean AND or OR function; and
operating a query generated by the user as a background query, wherein the operating comprises:
periodically running the query;
identifying a program according to the query;
displaying an icon on a screen, for view by the user, after identifying the program; and
recording the identified program if the user does not activate the icon prior to a viewing time of the identified program.

8. An electronic program guide displaying television programming information, comprising:
a memory communicatively coupled to a processor, wherein computer-executable instructions are stored on the memory, and wherein execution of the instructions by the processor results in operation of:
a user interface indicating television programming information comprising a plurality of channels, time periods and programs, wherein a user can realize when and on what channel a program is offered by viewing a program tile associated with the program, wherein the user interface implements recording and reminding functionality by providing icons configured to be dragged and dropped by the user into a program tile associated with any program, and wherein the icons can be seen after being dropped, to indicate desire by the user to record the program or be reminded of the program, respectively;
a find window within the user interface, displayed in response to activation of a query generating button, to assist the user in creating a query, wherein the query created by operation of the find window defines a search of an electronic programming guide database, wherein the user may save the query, and wherein the saving results in creation of a soft button, defined on the user interface, such that operation of the soft button allows a user to quickly retrieve and operate the saved query;
an advanced find window, displayed in response to selection of an advanced query button within the find window, wherein the advanced find window allows search by additional search parameters including keywords, wherein the advanced find window defines a plurality of user created searches, wherein a user created search may be saved by the user by associating the search with a tabbed folder displayed within the advanced find window, and wherein tabbed folders may be created and removed by operation of buttons within the advanced find window;
a unified query function configured to combine queries into a unified query, the combining being performed by a Boolean AND or OR function, the unified query function also configured to operate as a background query, the operating comprising:
periodically running the unified query function;
identifying a program according to the unified query;
displaying an icon on a screen, for view by the user, after identifying the program; and
recording the identified program if the user does not activate the icon prior to a viewing time of the identified program; and
a quick find window, displayed within the user interface, for presenting a list of programs to the user, wherein the presented list is obtained by searching using input data from a 10-key keypad such that each of 26 letters is associated with one key of the 10-key keypad, wherein the quick find window iteratively presents to the user, upon iterative searches prompted by a keystroke of the 10-key keypad, successively shorter lists of programs from which to select a desired program, wherein each program in the lists has sequential letters in a word in a title of the program corresponding to sequential keystrokes of the 10-key keypad.

* * * * *

UNITED STATES PATENT AND TRADEMARK OFFICE
CERTIFICATE OF CORRECTION

PATENT NO. : 8,051,450 B2  Page 1 of 1
APPLICATION NO. : 10/686984
DATED : November 1, 2011
INVENTOR(S) : James O. Robarts et al.

It is certified that error appears in the above-identified patent and that said Letters Patent is hereby corrected as shown below:

On the Title page, Item (57), under "Abstract" line 7, delete "preferences;" and insert
-- preferences, --, therefor.

Signed and Sealed this
Sixth Day of December, 2011

David J. Kappos
*Director of the United States Patent and Trademark Office*